United States Patent
Harada et al.

(10) Patent No.: US 12,437,805 B2
(45) Date of Patent: Oct. 7, 2025

(54) SEMICONDUCTOR DEVICE INCLUDING MEMORY ELEMENT

(71) Applicant: Unisantis Electronics Singapore Pte. Ltd., Singapore (SG)

(72) Inventors: Nozomu Harada, Tokyo (JP); Masakazu Kakumu, Tokyo (JP); Koji Sakui, Tokyo (JP)

(73) Assignee: UNISANTIS ELECTRONICS SINGAPORE PTE. LTD., Singapore (SG)

( * ) Notice: Subject to any disclaimer, the term of this patent is extended or adjusted under 35 U.S.C. 154(b) by 94 days.

(21) Appl. No.: 18/609,144

(22) Filed: Mar. 19, 2024

(65) Prior Publication Data
US 2024/0339154 A1  Oct. 10, 2024

(30) Foreign Application Priority Data
Apr. 4, 2023 (WO) .................. PCT/JP2023/013901

(51) Int. Cl.
*G11C 7/00* (2006.01)
*G11C 11/4096* (2006.01)
*H10B 12/00* (2023.01)

(52) U.S. Cl.
CPC .......... *G11C 11/4096* (2013.01); *H10B 12/20* (2023.02)

(58) Field of Classification Search
CPC ............................ G11C 11/4096; H10B 12/20
(Continued)

(56) References Cited

U.S. PATENT DOCUMENTS 7,438,628 B2 * 10/2008 Kundig .................. B24B 49/00
                                                                    451/10
8,343,832 B2 *  1/2013 Nishi ..................... H10D 84/83
                                                                    257/302
(Continued)

FOREIGN PATENT DOCUMENTS

JP           02-188966 A    7/1990
JP        2003-188279 A    7/2003
(Continued)

OTHER PUBLICATIONS

Hiroshi Takato, Kazumasa Sunouchi, Naoko Okabe, Akihiro Nitayama, Katsuhiko Hieda, Fumio Horiguchi, and Fujio Masuoka: IEEE Transaction on Electron Devices, vol. 38, No. 3, pp. 573-578 (1991) (6 pages).
(Continued)

*Primary Examiner* — Viet Q Nguyen
(74) *Attorney, Agent, or Firm* — Crowell & Moring LLP

(57) ABSTRACT

Provided is a semiconductor device including a memory cell and a MOS transistor. The memory cell includes a first gate insulating layer and a first gate conductor layer surrounding a first pillar-shaped p layer erected on a first p layer substrate, and a second gate insulating layer, a second gate conductor layer, and $N^+$ layers surrounding a second pillar-shaped p layer connected to the first pillar-shaped p layer. The MOS transistor includes a third pillar-shaped p layer erected on a second p layer substrate connected to the first p layer substrate, and a third gate insulating layer, a third gate conductor layer, and $N^+$ layers surrounding a fourth pillar-shaped p layer placed on and in contact with the third pillar-shaped p layer. In a vertical direction, the second pillar-shaped p layer has a length shorter than a length of the fourth pillar-shaped p layer.

15 Claims, 20 Drawing Sheets

(58) Field of Classification Search
USPC .................................................. 365/189.011
See application file for complete search history.

(56) References Cited

U.S. PATENT DOCUMENTS

| | | | | |
|---|---|---|---|---|
| 8,421,146 | B2* | 4/2013 | Nojima | H10D 30/025 |
| | | | | 257/E21.345 |
| 8,497,174 | B2* | 7/2013 | Cho | H10D 30/025 |
| | | | | 438/270 |
| 9,111,791 | B2* | 8/2015 | Fujisawa | H01L 23/488 |
| 11,683,935 | B2* | 6/2023 | Yano | H10B 41/00 |
| | | | | 257/326 |
| 11,800,696 | B2* | 10/2023 | Fackenthal | G11C 11/418 |
| 12,106,796 | B2* | 10/2024 | Harada | H10B 12/50 |
| 2003/0111681 | A1 | 6/2003 | Kawanaka | |
| 2006/0157738 | A1 | 7/2006 | Kawanaka | |
| 2008/0137394 | A1 | 6/2008 | Shimano et al. | |
| 2008/0205133 | A1 | 8/2008 | Gonzalez et al. | |
| 2020/0135863 | A1 | 4/2020 | Han et al. | |
| 2022/0320097 | A1 | 10/2022 | Harada et al. | |
| 2023/0077140 | A1 | 3/2023 | Kakumu et al. | |
| 2023/0269925 | A1* | 8/2023 | Harada | H10B 12/20 |
| | | | | 438/257 |
| 2023/0301057 | A1* | 9/2023 | Harada | H10B 12/20 |
| 2023/0397394 | A1* | 12/2023 | Harada | G11C 11/4096 |

FOREIGN PATENT DOCUMENTS

| | | |
|---|---|---|
| JP | 2008-147514 | 6/2008 |
| JP | 2010-519770 | 6/2010 |
| WO | WO 2022/208658 A1 | 10/2022 |
| WO | WO 2023/032193 A1 | 3/2023 |

OTHER PUBLICATIONS

H. Chung, H. Kim, H. Kim, K. Kim, S. Kim, K. W. Song, J. Kim, Y.C. Oh, Y. Hwang, H. Hong, G. Jin, and C. Chung: "4F2 DRAM Cell with Vertical Pillar Transistor(VPT)," 2011 Proceeding of the European Solid-State Device Research Conference, (2011) (4 pages).

H. S. Philip Wong, S. Raoux, S. Kim, Jiale Liang, J. R. Reifenberg, B. Rajendran, M. Asheghi and K. E. Goodson: "Phase Change Memory," Proceeding of IEEE, vol. 98, No. 12, Dec., pp. 2201-2227 (2010) (27 pages).

K. Tsunoda, K .Kinoshita, H. Noshiro, Y. Yamazaki, T. Iizuka, Y. Ito, A. Takahashi, A. Okano, Y. Sato, T. Fukano, M. Aoki, and Y. Sugiyama : "Low Power and high Speed Switching of Ti-doped NiO ReRAM under the Unipolar Voltage Source of less than 3V," IEDM (2007) (4 pages).

W. Kang, L. Zhang, J. Klein, Y. Zhang, D. Ravelosona, and W. Zhao: "Reconfigurable Codesign of STT-MRAM Under Process Variations in Deeply Scaled Technology,"IEEE Transaction on Electron Devices, pp. 1-9 (2015) (9 pages).

M.G. Ertosun, K. Lim, C. Park, J. Oh, P. Kirsch, and K. C. Saraswat : "Novel Capacitorless Single-Transistor Charge-Trap DRAM (1T CT DRAM) Utilizing Electron," IEEE Electron Device Letter, vol. 31, No. 5, pp. 405-407, (2010) (3 pages).

E. Yoshida, and T. Tanaka: "A Capacitorless 1T-DRAM Technology Using Gate-Induced Drain-Leakage (GIDL) Current for Low Power and High-Speed Embedded Memory," IEEE Transactions on Electron Devices, vol. 53, No. 4, pp. 692-697,Apr. 2006. (6 pages).

Md. Hasan Raza Ansari, Nupur Navlakha, Jae Yoon-Lee, Seongjae Cho, "Double-Gate Junctionless 1T DRAM With Physical Barriers for Retention Improvement", IEEE Trans, on Electron Devices vol 67, pp. 1471-1479 (2020) (9 pages).

Takashi Ohasawa and Takeshi Hamamoto, "Floating Body Cell—a Novel Body Capacitorless DRAM Cell", Pan Stanford Publishing (2011) (140 pages).

Marton M. Frank "High-k/Metal Gate Innovations Enabling Continued DMOS Scaling" Proc. Of the 41st European Solid-state Device Research Conference pp. 50-58(2011) (9 pages).

H. Miyagawa et al. "Metal-Assisted Solid-Phase Crystallization Process for Vertical Monocrystalline Si Channel in 3D Flash Memory", IEDM19 digest paper, pp. 650-653(2019) (4 pages).

International Preliminary Report on Patentability (in Japanese) in PCT Application No. PCT/JP2023/013901, dated Oct. 19, 2023 (5 pages).

* cited by examiner

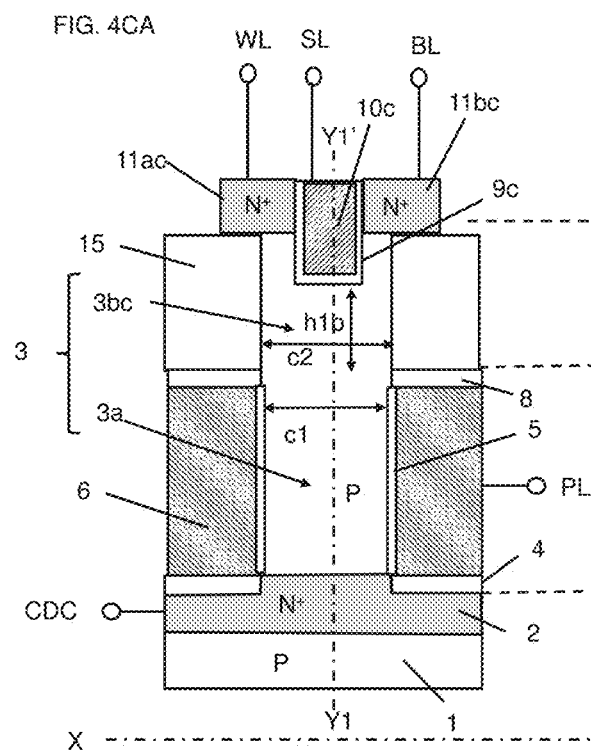
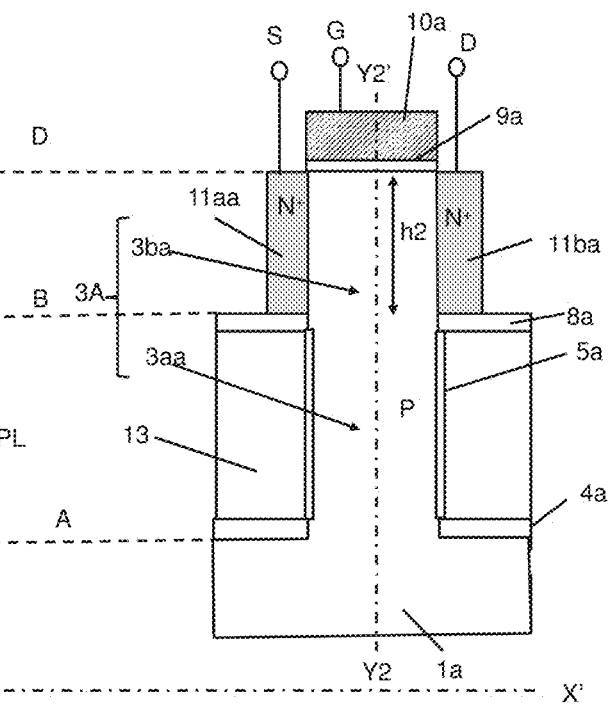
FIG. 4CA  FIG. 4CB

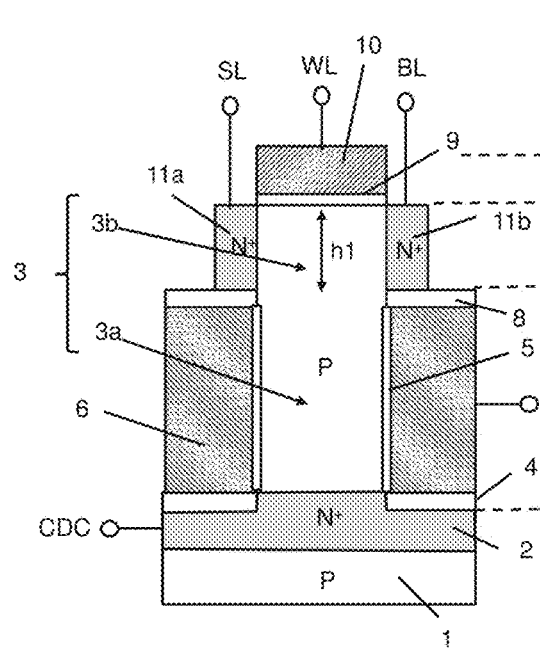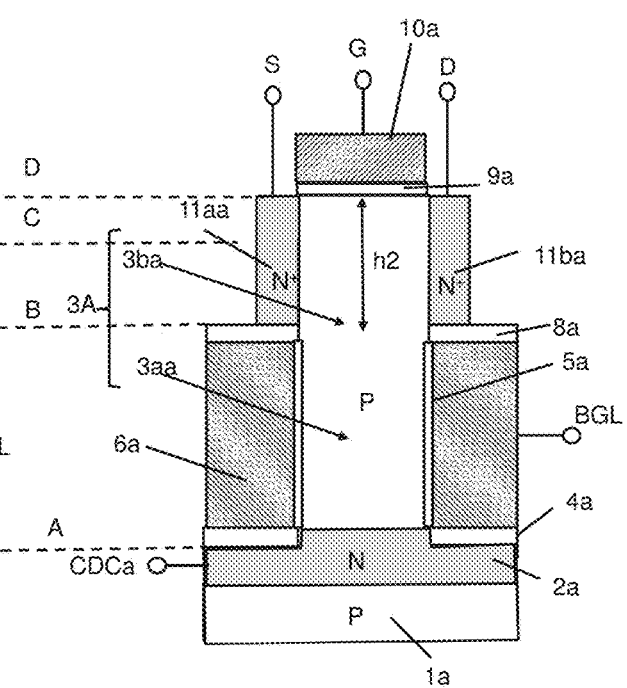

FIG. 8BA
FIG. 8BB
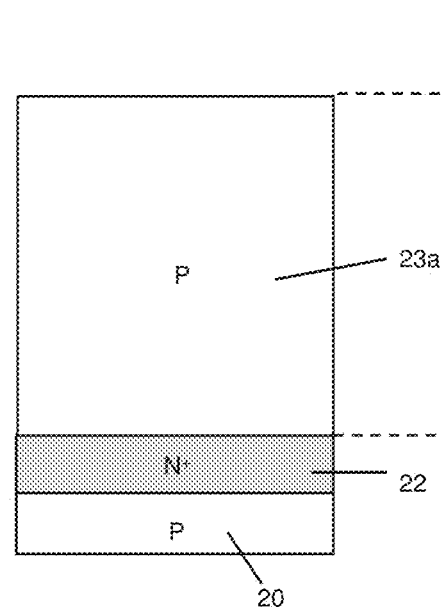
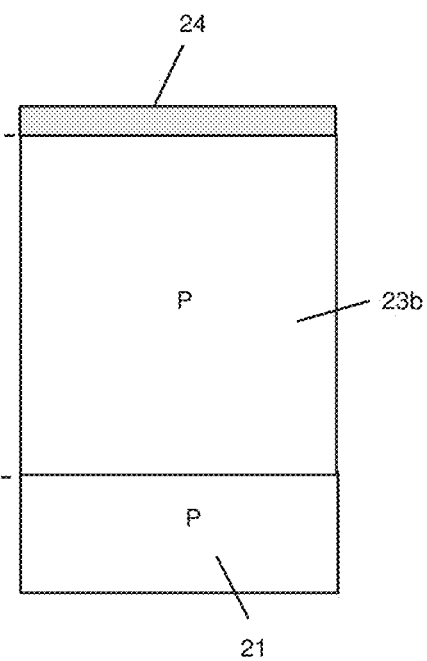

FIG. 8EA
FIG. 8EB
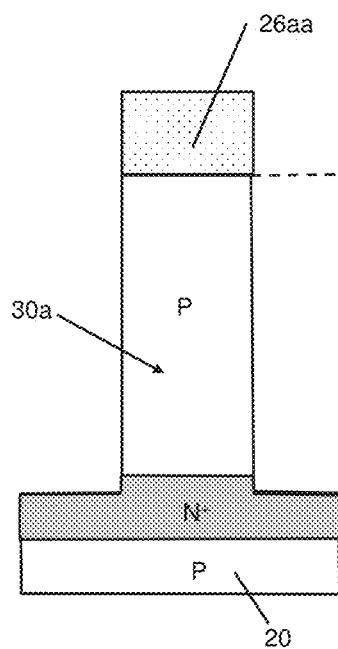
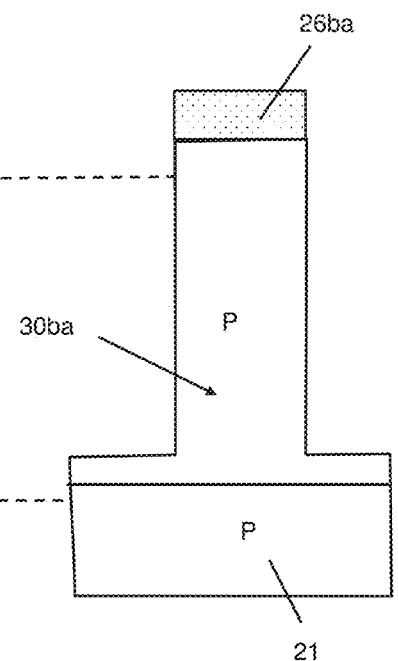

FIG. 8FA
FIG. 8FB
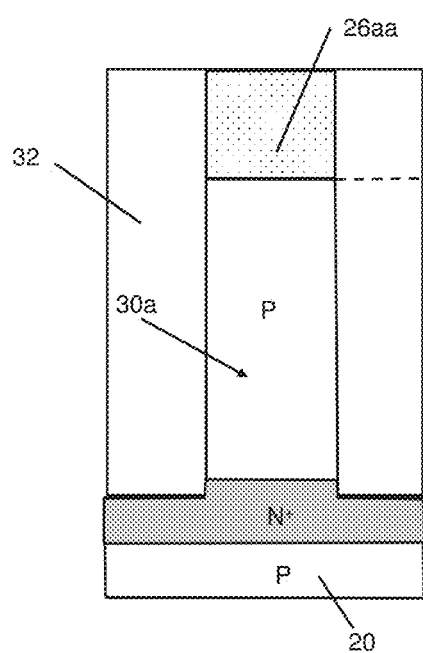
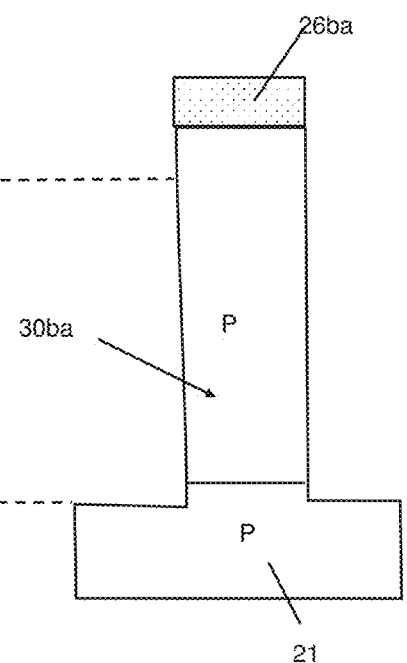

FIG. 8GA
FIG. 8GB
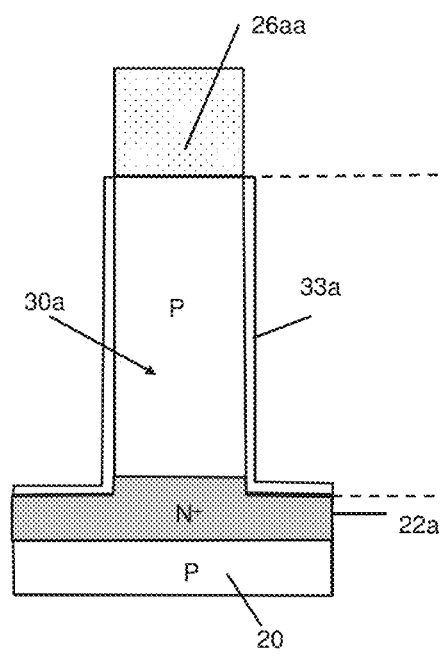
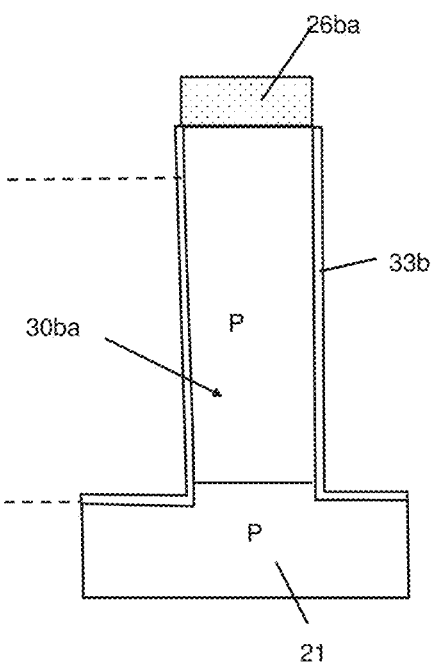

FIG. 8HA
FIG. 8HB
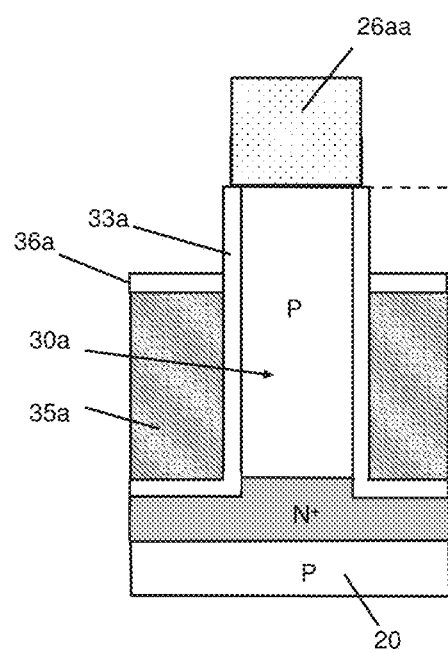
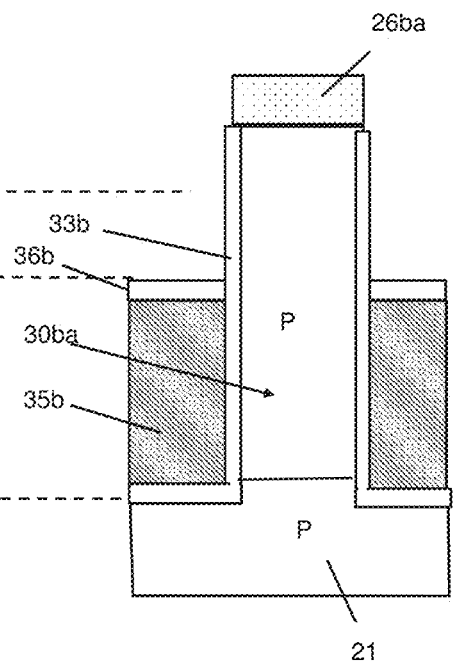

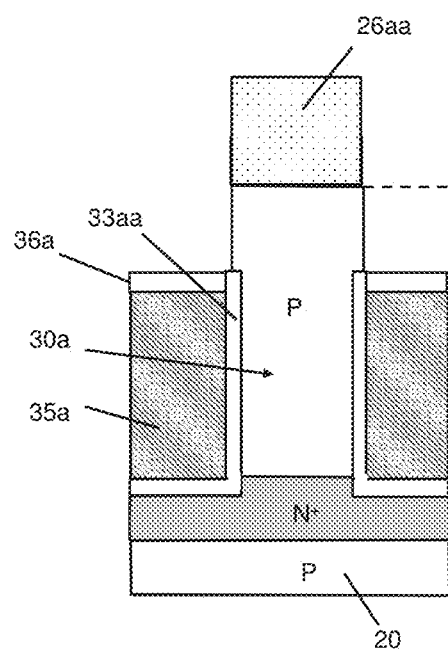
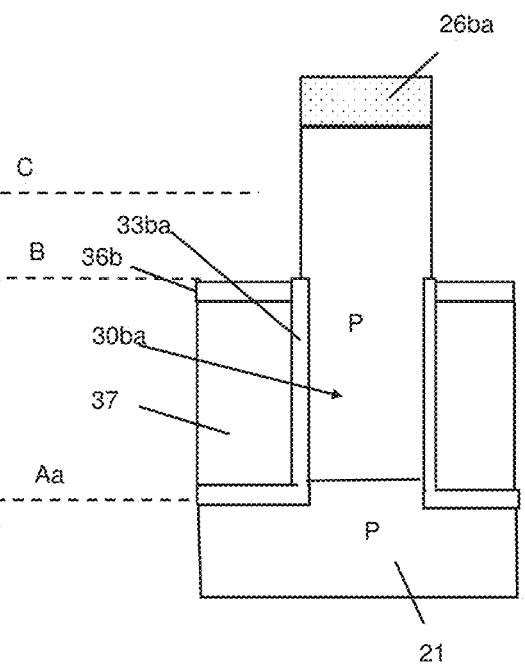
FIG. 81A
FIG. 81B

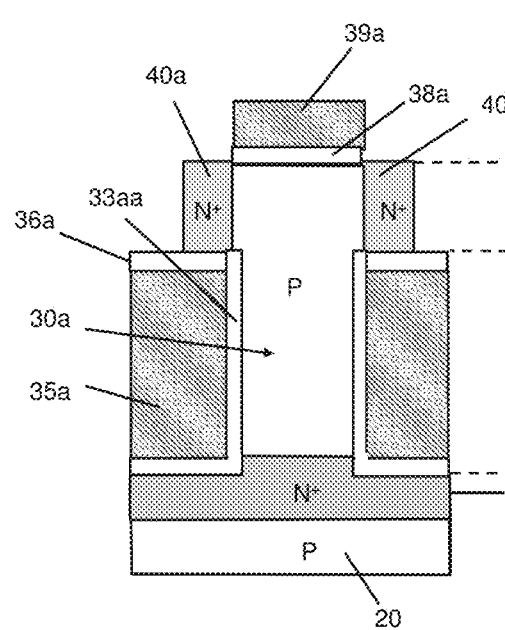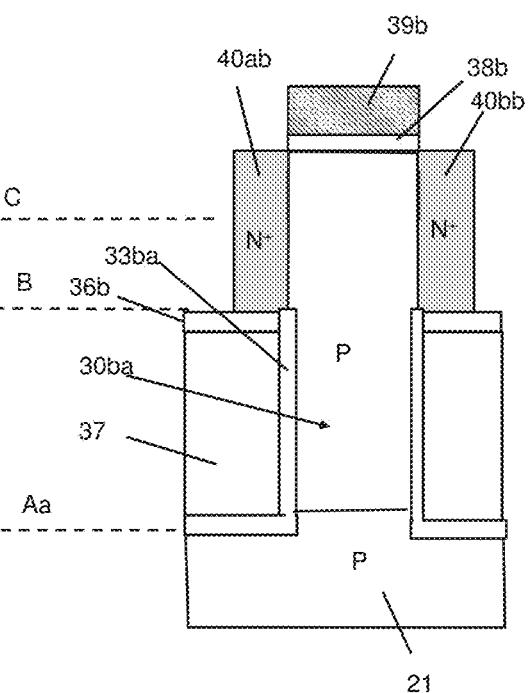
FIG. 8JA  FIG. 8JB

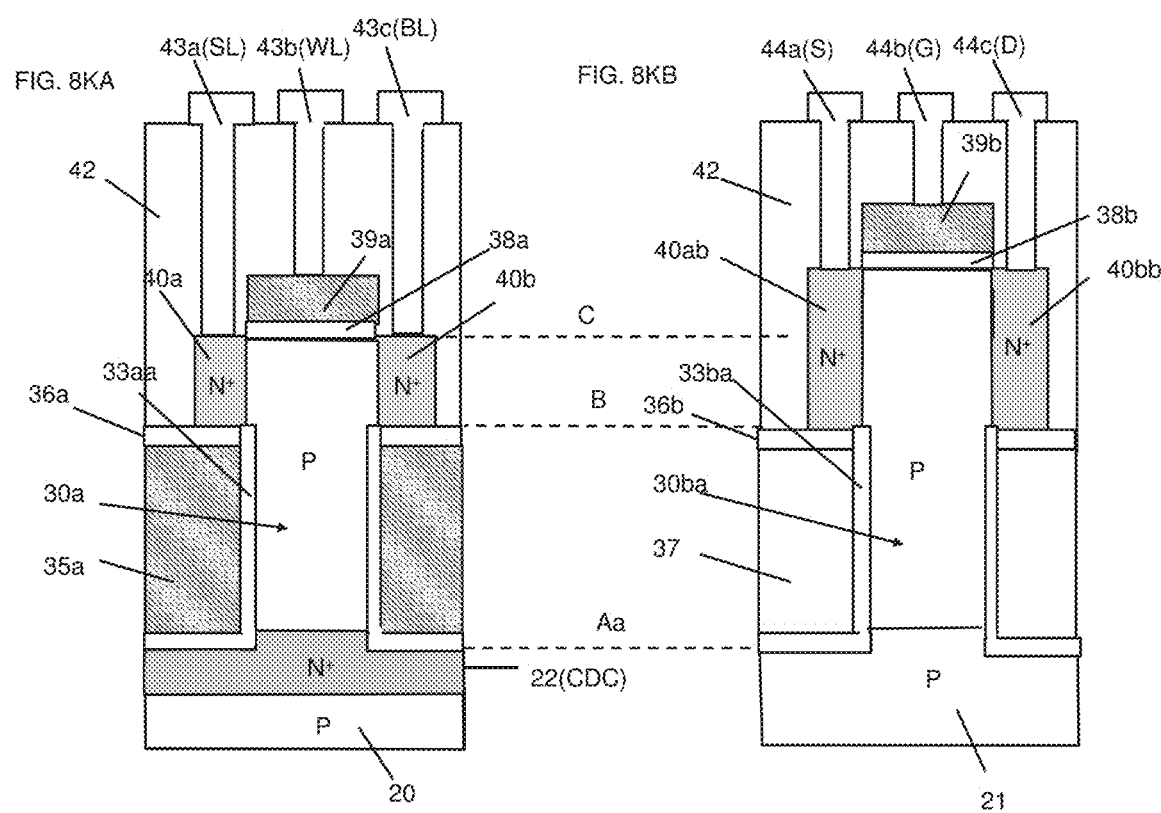

SEMICONDUCTOR DEVICE INCLUDING MEMORY ELEMENT

CROSS-REFERENCE TO RELATED APPLICATIONS

This application claims priority to PCT/JP2023/013901, filed Apr. 4, 2023, the entire content of which is incorporated herein by reference.

BACKGROUND OF THE INVENTION

Field of the Invention

The present invention relates to a semiconductor device including a memory element.

Description of the Related Art

High integration, high performance, low electric power consumption, and high functionality of a semiconductor device using a memory element have been requested in recent development of large scale integration (LSI) technologies.

Typical planar MOS transistors have a channel extending in a horizontal direction along an upper surface of a semiconductor substrate. In contrast, SGTs (Surrounding Gate Transistors) have a channel extending in a direction perpendicular to the upper surface of a semiconductor substrate (see, for example, Japanese Patent Laid-Open No. 2-188966 and Hiroshi Takato, Kazumasa Sunouchi, Naoko Okabe, Akihiro Nitayama, Katsuhiko Hieda, Fumio Horiguchi, and Fujio Masuoka: IEEE Transaction on Electron Devices, Vol. 38, No. 3, pp. 573-578 (1991)). Thus, the SGTs allow higher packaging density of a semiconductor device than the planar MOS transistors do. The use of the SGTs as selection transistors allows high integration of a DRAM (Dynamic Random Access Memory; see, for example, H. Chung, H. Kim, H. Kim, K. Kim, S. Kim, K. W. Song, J. Kim, Y. C. Oh, Y. Hwang, H. Hong, G. Jin, and C. Chung: "4F2 DRAM Cell with Vertical Pillar Transistor (VPT)," 2011 Proceeding of the European Solid-State Device Research Conference, (2011)) to which a capacitor is connected, a PCM (Phase Change Memory; see, for example, H. S. Philip Wong, S. Raoux, S. Kim, Jiale Liang, J. R. Reifenberg, B. Rajendran, M. Asheghi and K. E. Goodson: "Phase Change Memory," Proceeding of IEEE, Vol. 98, No 12, December, pp2b012b27 (2010)) to which a variable resistance element is connected, a RRAM (Resistive Random Access Memory; see, for example, K. Tsunoda, K. Kinoshita, H. Noshiro, Y. Yamazaki, T. Iizuka, Y. Ito, A. Takahashi, A. Okano, Y. Sato, T. Fukano, M. Aoki, and Y. Sugiyama: "Low Power and high Speed Switching of Ti-doped NiO ReRAM under the Unipolar Voltage Source of less than 3 V," IEDM (2007)), a MRAM (Magneto-resistive Random Access Memory; see, for example, W. Kang, L. Zhang, J. Klein, Y. Zhang, D. Ravelosona, and W. Zhao: "Reconfigurable Codesign of STT-MRAM Under Process Variations in Deeply Scaled Technology," IEEE Transaction on Electron Devices, pp. 1-9 (2015)) that changes resistance by changing the orientation of magnetic spin by current, and the like. There are also a DRAM memory cell (see M. G. Ertosun, K. Lim, C. Park, J. Oh, P. Kirsch, and K. C. Saraswat: "Novel Capacitorless Single-Transistor Charge-Trap DRAM (1T CT DRAM) Utilizing Electron," IEEE Electron Device Letter, Vol. 31, No. 5, pp. 405-407 (2010)) including no capacitor and composed of a single MOS transistor, a DRAM memory cell (see Md. Hasan Raza Ansari, Nupur Navlakha, Jae Yoon Lee, Seongjae Cho, "Double-Gate Junctionless 1T DRAM With Physical Barriers for Retention Improvement", IEEE Trans, on Electron Devices vol. 67, pp. 1471-1479 (2020)) including a groove portion in which carriers are accumulated and two gate electrodes, and the like. However, a problem with a DRAM including no capacitor is that a sufficient voltage margin cannot be obtained due to high dependency on coupling of a gate electrode to a word line of a floating body. There is also a memory element having a MOS transistor that performs data writing and data erasure and a second channel connected to the underside of a first channel of the MOS transistor and accumulates signal charges to be "1", "0" memory data (see, for example, US 2023/0077140 A1). There are challenges such as forming this memory element and a MOS transistor of a logic circuit on the same substrate at low cost without degrading properties of the memory element. The present application relates to a semiconductor device which can be composed only of a MOS transistor without a variable resistance element or a capacitor and in which a memory element using a semiconductor element and the MOS transistor are formed on the same substrate.

A single-transistor DRAM (gain cell) including no capacitor has a problem in that capacitive coupling between a word line and a body including an element in a floating state is large, and amplification of the potential of the word line at data reading and writing is directly transferred as noise to the body of a semiconductor substrate. This causes problems of erroneous reading and erroneous rewriting of stored data and makes it difficult to put the single-transistor DRAM including no capacitor into practical use. The above-described problems need to be solved, and a memory cell and a MOS transistor in a peripheral logic circuit need to be manufactured at high density and low cost.

SUMMARY OF THE INVENTION

To solve the above-described problems, a semiconductor device including a memory element according to a first invention is a semiconductor device including:
   a memory element including
      a first semiconductor pillar erected on a substrate in a vertical direction with respect to the substrate,
      a first impurity region connected to a bottom of the first semiconductor pillar,
      a first gate insulating layer placed in contact with a side surface of the first semiconductor pillar,
      a first gate conductor layer placed in contact with the first gate insulating layer,
      a second semiconductor pillar placed on and in contact with the first semiconductor pillar,
      a first insulating layer placed on the first gate conductor layer and surrounding a vicinity of a boundary between the first semiconductor pillar and the second semiconductor pillar,
      a second impurity region and a third impurity region placed in contact with the second semiconductor pillar and on the first insulating layer and opposed to each other in a horizontal direction,
      a second gate insulating layer placed in contact with at least one of an upper surfaces and opposite side surfaces of the second semiconductor pillar between the second impurity region and the third impurity region in the horizontal direction, and
      a second gate conductor layer placed in contact with the second gate insulating layer; and a MOS transistor including
  a third semiconductor pillar erected on the substrate in the vertical direction with respect to the substrate,
  a first material layer surrounding the third semiconductor pillar and containing an insulating material or a conductor material insulated from the third semiconductor pillar,
  a fourth semiconductor pillar placed on and in contact with the third semiconductor pillar,
  a third gate insulating layer placed in contact at least with opposite side surfaces of the fourth semiconductor pillar,
  a third gate conductor layer placed in contact with the third gate insulating layer, and
  a fourth impurity region and a fifth impurity region placed in contact with a portion of the fourth semiconductor pillar and opposed to each other in the horizontal direction, the portion being not covered by the third gate insulating layer, in which
in the vertical direction, the second semiconductor pillar has a length shorter than a length of the fourth semiconductor pillar.

A second invention is the above-described first invention in which in the vertical direction, the first semiconductor pillar and the third semiconductor pillar have upper surfaces at a substantially same position.

A third invention is the above-described first invention in which in the vertical direction, the first semiconductor pillar and the third semiconductor pillar have bottoms at a substantially same position.

A fourth invention is the above-described first invention in which the first material layer includes
  a second insulating layer surrounding the third semiconductor pillar, and
  a first conductor layer surrounding the second insulating layer, and
  a temporally-constant or varying voltage is applied to the first conductor layer.

A fifth invention is the above-described fourth invention in which the MOS transistor includes a sixth impurity region connected to a bottom of the third semiconductor pillar.

A sixth invention is the above-described first invention in which the MOS transistor is a Fin MOS transistor composed of the fourth semiconductor pillar, the third gate insulating layer, the third gate conductor layer, the fourth impurity region, and the fifth impurity region.

A seventh invention is the above-described first invention in which in the memory element, a transistor composed of the second semiconductor pillar, the second gate insulating layer, the second gate conductor layer, the second impurity region, and the third impurity region is a planar MOS transistor.

An eighth invention is the above-described first invention in which in the memory element, a transistor composed of the second semiconductor pillar, the second gate insulating layer, the second gate conductor layer, the second impurity region, and the third impurity region is a Fin MOS transistor.

A ninth invention is the above-described first invention in which
  in the memory element, a transistor composed of the second semiconductor pillar, the second gate insulating layer, the second gate conductor layer, the second impurity region, and the third impurity region is a planar MOS transistor having a U-shaped channel,
  the second semiconductor pillar has a vertical cross-section having a U-shape, and
  a length in the vertical direction of the second semiconductor pillar at a bottom of the U-shape is shorter than the length of the fourth semiconductor pillar.

A tenth invention is the above-described first invention in which the first impurity region is connected to a bottom of a semiconductor pillar of another memory cell adjacent to the first semiconductor pillar.

An eleventh invention is the above-described first invention in which the first impurity region is isolated from an impurity layer at a bottom of a semiconductor pillar of another memory cell adjacent to the first semiconductor pillar.

A twelfth invention is the above-described first invention in which the first gate conductor layer is divided into two or more layers in the vertical direction.

A thirteenth invention is the above-described first invention in which the first gate conductor layer is divided into two or more layers in a horizontal cross-section.

A fourteenth invention is the above-described first invention in which the semiconductor device performs
  a memory write operation of controlling voltages to be applied to the second impurity region, the third impurity region, and the second gate conductor layer to generate, in the second semiconductor pillar, a group of electrons and a group of holes by an impact ionization phenomenon based on a current caused to flow between the second impurity region and the third impurity region or by a gate-induced drain leakage current, and causing part or whole of the group of electrons or the group of holes which are majority carriers in the group of electrons and the group of holes as generated to remain mainly in the first semiconductor pillar, and
  a memory erase operation of extracting the group of electrons or the group of holes which remain and are majority carriers from any or all of the first impurity region, the second impurity region, and the third impurity layer.

A fifteenth invention is the above-described first invention in which the semiconductor device performs
  a memory write operation of controlling voltages to be applied to one or both of the second impurity region and the third impurity region, the first impurity region, and the first gate conductor layer to generate, in the first semiconductor pillar, a group of electrons and a group of holes by an impact ionization phenomenon based on a current caused to flow between one or both of the second impurity region and the third impurity region, and the first impurity region or by a gate-induced drain leakage current, and causing part or whole of the group of electrons or the group of holes which are majority carriers in the group of electrons and the group of holes as generated to remain mainly in the first semiconductor pillar, and
  a memory erase operation of extracting the group of electrons or the group of holes which remain and are majority carriers from any or all of the first impurity region, the second impurity region, and the third impurity layer.

BRIEF DESCRIPTION OF THE DRAWINGS

FIGS. 4CA and 4CB are explanatory diagrams of a structure of the memory cell and the MOS transistor of the logic circuit according to the present embodiment formed on the same substrate;

FIGS. 7A and 7B are explanatory diagrams of a structure of the memory cell and the MOS transistor of the logic circuit according to the present embodiment formed on the same substrate;

FIGS. 8BA and 8BB are explanatory diagrams of the manufacturing method for forming the memory cell and the MOS transistor of the logic circuit according to the present embodiment on the same substrate;

FIGS. 8EA and 8EB are explanatory diagrams of the manufacturing method for forming the memory cell and the MOS transistor of the logic circuit according to the present embodiment on the same substrate;

FIGS. 8FA and 8FB are explanatory diagrams of the manufacturing method for forming the memory cell and the MOS transistor of the logic circuit according to the present embodiment on the same substrate;

FIGS. 8GA and 8GB are explanatory diagrams of the manufacturing method for forming the memory cell and the MOS transistor of the logic circuit according to the present embodiment on the same substrate;

FIGS. 8HA and 8HB are explanatory diagrams of the manufacturing method for forming the memory cell and the MOS transistor of the logic circuit according to the present embodiment on the same substrate;

FIGS. 8IA and 8IB are explanatory diagrams of the manufacturing method for forming the memory cell and the MOS transistor of the logic circuit according to the present embodiment on the same substrate;

FIGS. 8JA and 8JB are explanatory diagrams of the manufacturing method for forming the memory cell and the MOS transistor of the logic circuit according to the present embodiment on the same substrate; and FIGS. 8KA and 8KB are explanatory diagrams of the manufacturing method for forming the memory cell and the MOS transistor of the logic circuit according to the present embodiment on the same substrate.

DETAILED DESCRIPTION OF THE PREFERRED EMBODIMENT

Hereinafter, a memory device using a semiconductor element and a manufacturing method thereof according to an embodiment of the present invention will be described with reference to the drawings.

A structure of a memory cell according to the present embodiment will be described using FIG. 1. A write mechanism of the memory cell according to the present embodiment will be described using FIGS. 2A, 2B, and 2C. A data erase mechanism of the memory cell according to the present embodiment will be described using FIGS. 3A, 3B, and 3C. A structure of the memory cell and a MOS transistor (a MOS field-effect transistor; hereinafter called a MOS transistor) of a logic circuit according to the present embodiment formed on the same substrate will be described using FIGS. 4AA to 4CB, FIGS. 5A, 5B, and FIGS. 6A, 6B. A method for manufacturing the memory cell and the MOS transistor of the logic circuit according to the present embodiment formed on the same substrate shown in FIGS. 4AA to 4CB will be described using FIGS. 8AA to 8KB.

Figure 1:
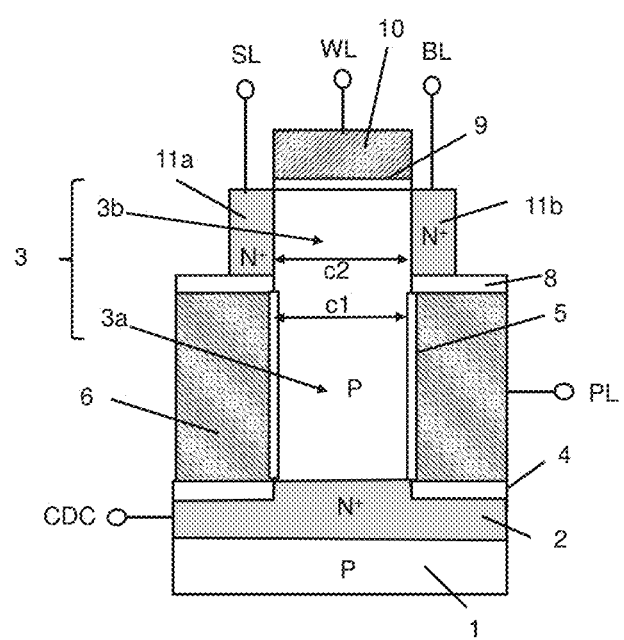
FIG. 1 is a cross-sectional structural diagram of a memory device using a semiconductor element according to an embodiment.

FIG. 1 shows a vertical cross-sectional structure of the memory cell using the semiconductor element according to the embodiment of the present invention. A semiconductor region 2 (which is an example of a "first impurity region" in the claims) containing donor impurities at high concentrations is placed on a p layer substrate 1 (which is an example of a "substrate" in the claims) (hereinafter, the semiconductor region containing donor impurities at high concentrations will be referred to as an "$n^+$ layer"). A pillar-shaped p layer 3 (which is an example of a "first semiconductor pillar" in the claims) which contains acceptor impurities and whose horizontal cross-section is rectangular as an example is placed on the $n^+$ layer 2. An insulating layer 4 is placed in contact with an upper surface of the $n^+$ layer 2 in an outer circumferential part of the pillar-shaped p layer 3 in plan view. A first gate insulating layer 5 (which is an example of a "first gate insulating layer" in the claims) is placed in contact with the pillar-shaped p layer 3. A first gate conductor layer 6 (which is an example of a "first gate conductor layer" in the claims) is placed in contact with the first gate insulating layer 5. A first insulating layer 8 (which is an example of a "first insulating layer" in the claims) is placed on the first gate insulating layer 5 and the first gate conductor layer 6. The pillar-shaped p layer 3 is composed of a pillar-shaped p layer 3a in contact with the first gate insulating layer 5 and a pillar-shaped p layer 3b placed on the upper part of the pillar-shaped p layer 3a. An $n^+$ layer 11a (which is an example of a "second impurity region" in the claims) containing donor impurities at high concentrations is placed on one side of the pillar-shaped p layer 3b in the horizontal direction. An $n^+$ layer 11b (which is an example of a "third impurity layer" in the claims) is placed on one side opposite to the $n^+$ layer 11a. A second gate insulating layer 9 (which is an example of a "second gate insulating layer" in the claims) is placed in contact with an upper surface or the upper surface and opposite side surfaces of the pillar-shaped p layer 3b. A second gate conductor layer 10 (which is an example of a "second gate conductor layer" in the claims) is placed in contact with the second gate insulating layer 9.

The n⁺ layer 11a is connected to a source line SL. The n⁺ layer 11b is connected to a bit line BL. The second gate conductor layer 10 is connected to a word line WL. The first gate conductor layer 6 is connected to a plate line PL. The n⁺ layer 2 is connected to a control line CDC. A memory operation is performed by operating electric potentials of the source line SL, the bit line BL, the plate line PL, the word line WL, and the control line CDC. In an actual memory device, a large number of memory cells as described above are arranged two-dimensionally on the p layer substrate 1. Note that the first gate conductor layer 6 may be divided into two layers in plan view, connected to separate plate lines, and driven synchronously or asynchronously.

Note that in a case where the MOS transistor composed of the n⁺ layers 11a, 11b, the pillar-shaped p layer 3b, the second gate insulating layer 9, and the second gate conductor layer 10 is a planar MOS transistor, the second gate insulating layer 9 is placed on the upper surface in the vertical direction of the pillar-shaped p layer 3b. The second gate conductor layer 10 covers the second gate insulating layer 9. In a case where the MOS transistor is a Fin MOS transistor, the second gate insulating layer 9 is placed at least on the opposite side surfaces of the pillar-shaped p layer 3b between the n⁺ layers 11a and 11b, and the second gate conductor layer 10 covers the second gate insulating layer 9. In this Fin MOS transistor, there are both cases in which the second gate conductor layer 10 is placed on the upper surface and the opposite side surfaces of the pillar-shaped p layer 3b and in which the second gate conductor layer 10 is placed only on the opposite side surfaces. In a case where the MOS transistor is a planar MOS transistor having a U-shaped channel, the cross-sectional shape of the p layer 3b is a U-shape, and the second gate conductor layer 10 is formed on an inner side surface.

The pillar-shaped p layers 3a and 3b may have a rectangular, trapezoidal, or barreled vertical cross-section. The pillar-shaped p layer 3b may have a plate shape having a small thickness in the vertical direction.

In FIG. 1, a horizontal length c1 of the upper surface of the pillar-shaped p layer 3a and a horizontal length c2 of a lower surface of the pillar-shaped p layer 3b between the n⁺ layers 11a and 11b are equal. In contrast, the horizontal length c1 of the upper surface of the pillar-shaped p layer 3a may be shorter or longer than the horizontal length c2 of the lower surface of the pillar-shaped p layer 3b.

The first gate conductor layer 6 shown in FIG. 1 surrounds the pillar-shaped p layer 3a as a whole, but may be formed to partially surround the pillar-shaped p layer 3a in a horizontal cross-section.

In FIG. 1, the n⁺ layer 2 may have an upper surface position in the vertical direction above a lower surface position of the first gate conductor layer 6, so that the n⁺ layer 2 and the gate conductor layer 6 may be overlapped on each other in the vertical direction or may not be overlapped on each other.

In FIG. 1, the pillar-shaped p layer 3a and the pillar-shaped p layer 3b may have different impurity concentrations. An impurity concentration distribution may exist in the pillar-shaped p layer 3a. The n⁺ layer 2 may have an impurity concentration set to be lower than impurity concentrations of the n⁺ layers 11a and 11b. The pillar-shaped p layer 3b may be an n-type semiconductor layer. Whether the pillar-shaped p layer 3b is of the p-type or n-type, a channel voltage between the n⁺ layers 11a and 11b is controlled by setting work functions based on selection of materials of the second gate insulating layer 9 and the second gate conductor layer 10 as well as applied voltages.

The n⁺ layer 11a and the n⁺ layer 11b may be formed of p⁺ layers (hereinafter, a semiconductor region containing acceptor impurities at high concentrations will be referred to as a "p⁺ layer") in which holes are majority carriers, so that the memory may be operated using electrons as writing carriers. In this case, it is desirable to use such materials that the work function of the first gate conductor layer 6 is lower than the work function of the second gate conductor layer 10.

A p well structure, a SOI (Silicon On Insulator) substrate, or the like may be used as the p layer substrate 1 in FIG. 1.

The insulating layer 4 in FIG. 1 may be formed integrally with the first gate insulating layer 5. The n⁺ layer 2 and the first gate conductor layer 6 should only be insulated from each other.

It is desirable that the work function of the second gate conductor layer 10 should be lower than the work function of the first gate conductor layer 6. The first gate conductor layer 6 and the second gate conductor layer 10 may be conductor layers such as metals, alloys, or highly-doped semiconductor layers. The first gate conductor layer 6 and the second gate conductor layer 10 may be composed of a plurality of conductor layers.

Figure 2A:
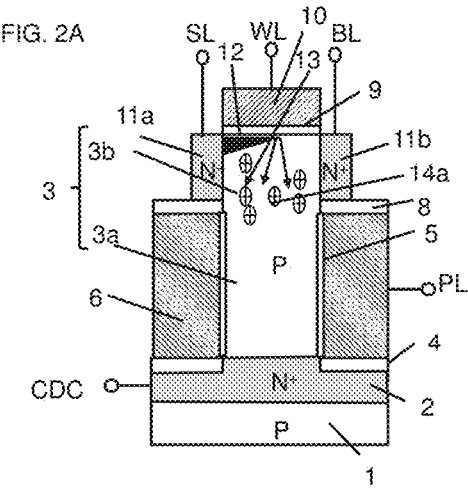
FIGS. 2A, 2B, and 2C are explanatory diagrams of a write operation of the memory device using the semiconductor element according to the embodiment.

A write operation of the memory cell according to the embodiment of the present invention will be described with reference to FIGS. 2A, 2B, and 2C. For example, poly-Si containing acceptor impurities at high concentrations (hereinafter, poly-Si containing acceptor impurities at high concentrations will be referred to as a "P⁺ poly") is used for the first gate conductor layer 6 connected to the plate line PL. Poly-Si containing donor impurities at high concentrations (hereinafter, poly-Si containing donor impurities at high concentrations will be referred to as an "n⁺ poly") is used for the second gate conductor layer 10 connected to the word line WL. As shown in FIG. 2A, the MOS transistor in this memory cell operates with the n⁺ layer 11a to be a source, the n⁺ layer 11b to be a drain, the second gate insulating layer 9 to be a gate insulating layer, the second gate conductor layer 10 to be a gate, and the pillar-shaped p layer 3b to be a channel serving as components. For example, 0 V is applied to the n⁺ layer 2, 0 V is input to the n⁺ layer 11a connected to the control line CDC to which the source line SL is connected, 3 V, for example, is input to the n⁺ layer 11b to which the bit line BL is connected, 0 V is input to the first gate conductor layer 6 to which the plate line PL is connected, and 1.5 V is input to the second gate conductor layer 10 to which the word line WL is connected. At this time, a partial inversion layer 12 is formed in the pillar-shaped p layer 3b directly under the gate insulating layer 9 located under the gate conductor layer 10, and a pinch-off point 13 exists. In this case, the MOS transistor having the second gate conductor layer 10 operates in a saturated region.

As a result, the electric field is maximized in the vicinity of a boundary region between the pinch-off point 13 and the n⁺ layer 11b in the MOS transistor having the second gate conductor layer 10, and an impact ionization phenomenon occurs in this region. Through this impact ionization phenomenon, accelerated electrons from the n⁺ layer 11a to which the source line SL is connected toward the n⁺ layer 11b to which the bit line BL is connected collide with a Si lattice, and electron-hole pairs are generated by kinetic energy of the electrons. A generated group of holes 14a is diffused toward a side lower in hole concentration due to the gradient of the concentration thereof. Some of the generated electrons flow to the gate conductor layer 10, but most of them flow to the n⁺ layer 11b connected to the bit line BL. Note that instead of causing the above-described impact ionization phenomenon to occur, gate-induced drain leakage (GIDL) current may be caused to flow to generate the group of holes 14a (see, for example, E. Yoshida, T, Tanaka, "A Capacitorless 1T-DARM Technology Using Gate-Induced Drain-Leakage (GIDL) Current for Low-Power and High-Speed Embedded Memory", IEEE Trans, on Electron Devices vol. 53, pp. 692-697 (2006)). Any other method by which the group of holes 14a can be generated may be used.

Figure 2B:
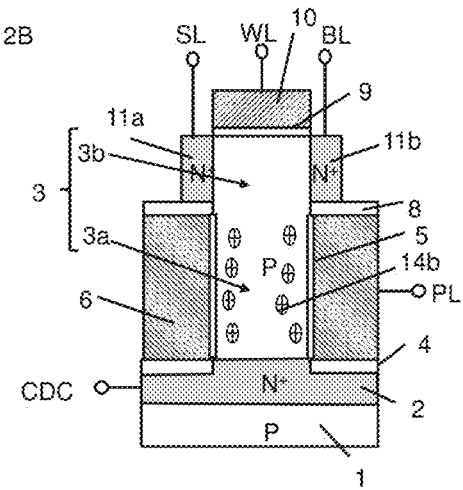

FIG. 2B shows a group of holes 14b accumulated in the pillar-shaped p layer 3a when the word line WL, the bit line BL, the plate line PL, the source line SL drop to 0 V immediately after writing. At the beginning, the concentration of generated holes is high in the region of the pillar-shaped p layer 3b, and the group of holes 14b moves toward the pillar-shaped p layer 3a by diffusion depending on the gradient of the concentration thereof. Further, since p$^+$ poly having a higher work function than the work function of n$^+$ poly is used for the first gate conductor layer 6, the group of holes 14b is accumulated at higher concentration in the vicinity of the first gate insulating layer 5 of the pillar-shaped p layer 3a. As a result, the hole concentration in the pillar-shaped p layer 3a becomes higher, compared with the hole concentration in the pillar-shaped p layer 3b. Since the pillar-shaped p layer 3a and the pillar-shaped p layer 3b are connected electrically, the pillar-shaped p layer 3a which is a substantial substrate of the MOS transistor having the gate conductor layer 10 is charged to be positively biased. The group of holes 14b moves toward the n$^+$ layers 11a and 11b or the n$^+$ layer 2 to gradually recombine with electrons, but a threshold voltage of the MOS transistor having the second gate conductor layer 10 drops due to a positive substrate bias effect caused by the group of holes 14b accumulated in the pillar-shaped p layer 3a. Accordingly, as shown in FIG. 2C, the threshold voltage of the MOS transistor having the second gate conductor layer 10 to which the word line WL is connected drops. This written state is assigned to logical storage data "1." Note that the conditions for voltages applied to the bit line BL, the source line SL, the word line WL, and the plate line PL described above are exemplary for performing the write operation, and other voltage conditions that allow the write operation to be performed may be adopted.

Figure 2C:
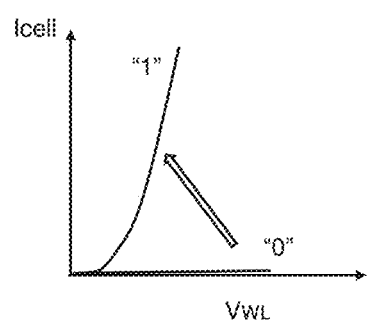

Although FIGS. 2A, 2B, and 2C show, as an example, the combination of the p$^+$ poly (work function: 5.15 eV) and the n$^+$ poly (work function: 4.05 eV) as a combination of the first gate conductor layer 6 and the second gate conductor layer 10, this may be a laminated structure of metals, metal nitrides, or alloys thereof (including silicide), such as Ni (work function: 5.2 eV) and n$^+$ poly, Ni and W (work function: 4.52 eV), or Ni and TaN (work function: 4.0 eV)/W/TiN (work function: 4.7 eV). The first gate conductor layer 6 and the second gate conductor layer 10 may be formed of the same conductor layer, and driving voltages may be changed to perform the above-described write operation. In the state as described above when data is held, for example, similar effects can also be obtained using the first gate conductor layer 6 and the second gate conductor layer 10 having the same work function and applying 0 V to the bit line BL, the word line WL, and the source line SL and 0.5 V to the plate line PL.

In the write operation of the memory cell, electron-hole pairs may be generated by the impact ionization phenomenon or GIDL current in the pillar-shaped p layer 3a in the vicinity of the boundary between the pillar-shaped p layer and one or both of the n$^+$ layers 11a and 11b based on current caused to flow between one or both of the n$^+$ layers 11a, 11b and the n$^+$ layer 2. Then, a group of holes in the generated electron-hole pairs is stored mainly in the pillar-shaped p layer 3a.

Figure 3A:
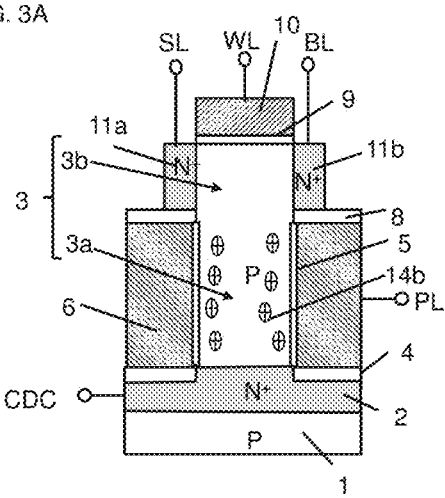
FIGS. 3A, 3B, and 3C are explanatory diagrams of an erase operation of the memory device using the semiconductor element according to the embodiment.
Figure 3B:
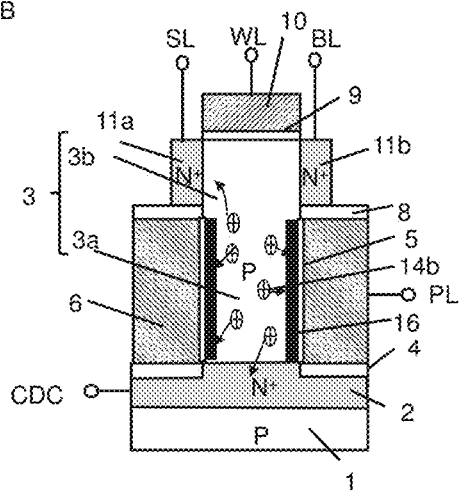
Figure 3C:
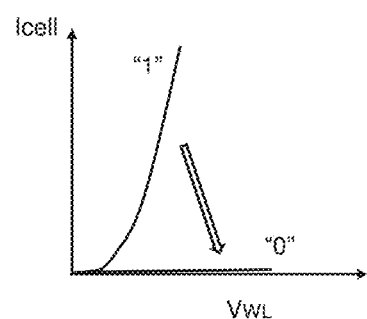

Next, an erase operation mechanism will be described using FIGS. 3A, 3B, and 3C. FIG. 3A shows a state immediately after the group of holes 14b generated by impact ionization in a previous cycle and accumulated is stored mainly in the pillar-shaped p layer 3a before the erase operation. As shown in FIG. 3B, at the erase operation, a negative voltage VERA is applied to the source line SL. The voltage of the plate line PL is set at 2 V. Herein, VERA is -0.5 V, for example. As a result, regardless of the value of an initial potential of the pillar-shaped p layer 3a, the PN junction between the n$^+$ layer 11a to which the source line SL is connected to serve as a source and the pillar-shaped p layer 3b becomes forward-biased. As a result, the group of holes 14b stored mainly in the pillar-shaped p layer 3a, generated by impact ionization in the previous cycle, moves to the n$^+$ layer 11a to which the source line is connected. As a result of applying 2 V to the plate line PL, an inversion layer 16 is formed on an interface between the first gate insulating layer 5 and the pillar-shaped p layer 3a and comes into contact with the n$^+$ layer 2. Therefore, the group of holes 14b accumulated in the pillar-shaped p layer 3a flows from the pillar-shaped p layer 3a to the n' layer 2 or the inversion layer 16 to be recombined with electrons. As a result, the hole concentration in the pillar-shaped p layer 3a decreases with time, and the threshold voltage of the MOSFET becomes higher than the threshold voltage when "1" is written to return to the initial state. Accordingly, as shown in FIG. 3C, the MOSFET having the gate conductor layer 10 to which the word line WL is connected returns to the initial threshold value. The erase state of this memory is logical storage data "0." At this data erasure, the recombination area of holes and electrons becomes substantially larger, compared at the data accumulation due to reliable performance of the data erase operation.

Note that if 2 V, for example, is applied to the plate line PL at the data erasure, the n$^+$ layer 11a, the n$^+$ layer 11b, and the n' layer 2 can be connected electrically by the inversion layer 16, and the data erase time can be shortened. In this case, it is desirable that the first insulating layer 4 and the second insulating layer 8 should have film thicknesses at the same level as the film thickness of the first gate insulating layer 5.

The conditions for voltages to be applied to the bit line BL, the source line SL, the word line WL, and the plate line PL described above are exemplary for performing the erase operation, and other voltage conditions that allow the erase operation to be performed may be adopted. The example in which the first gate conductor layer 6 is biased to 2 V has been described above, but at erasure, inversion layers in which electrons are majority carriers can be formed at the interface between the pillar-shaped p layer 3a and the first gate insulating layer 5 and the interface between the pillar-shaped p layer 3b and the second gate insulating layer 9 by biasing the bit line BL to 0.2 V, the source line SL to 0 V, and the first and second gate conductor layers 6, 10 to 2 V, for example. This can increase the recombination area of electrons and holes and can also shorten the erase time more proactively by further flowing current in which electrons are majority carriers between the bit line BL and the source line SL.

The structure and the operation mechanism of the present embodiment have the following characteristics.

(1) Since the pillar-shaped p layer 3b of the MOS transistor having the second gate conductor layer 10 to which the word line WL is connected is electrically connected to the pillar-shaped p layer 3a, the capacitance that can accumulate the generated group of holes 14a can be changed freely by adjusting the volume of the pillar-shaped p layer 3a. In other words, in order to extend the holding time, the depth of the pillar-shaped p layer 3a, for example, should only be increased. This achieves improvement in properties of holding stored data.

(2) It is possible to intentionally reduce the area to come into contact with the $n^+$ layer 2, the $n^+$ layer 11a, and the $n^+$ layer 11b involved in recombination with electrons relative to the volume of the pillar-shaped p layer 3a in which the group of holes 14b serving as a signal is mainly accumulated. This can prevent the group of holes 14b which are signal charges from being recombined with electrons, so that the holding time of the accumulated group of holes 14b can be increased.

(3) The group of holes 14b accumulated with the use of $p^+$ poly for the first gate conductor layer 6 are accumulated near the interface of the pillar-shaped p layer 3a in contact with the first gate insulating layer 5. This enables the group of holes 14b to be accumulated at a location apart from the contact portions between the $n^+$ layer 11a, the $n^+$ layer 11b and the pillar-shaped p layer 3b, which are PN junction portions which cause the recombination of electrons and holes, thereby enabling stable accumulation of the group of holes 14b. In addition, an operation voltage margin of "1" writing is widened by the substrate bias effect exerted by accumulation of the group of holes 14b in the pillar-shaped p layer 3a. As shown in FIGS. 3A, 3B, and 3C, in the data erase operation, the recombination area of holes and electrons is made substantially larger at data erasure, compared at data accumulation. This enables a stable state of logical information data "0" to be provided in a short period of time. The memory element is thus improved in operating speed.

(4) According to the present embodiment, the pillar-shaped p layer 3a is electrically connected to the p layer substrate 1 and the $n^+$ layer 2. The potential of the pillar-shaped p layer 3a can be controlled by the voltage applied to the gate conductor layer 6. Accordingly, both in write operation and erase operation, the substrate bias does not become unstable in a floating state during MOSFET operation nor a semiconductor portion below the second gate insulating layer 9 is completely depleted, unlike an SOI structure, for example. Thus, the threshold value, drive current, and the like of the MOS transistor are unlikely to be affected by the operating situation. Therefore, as for characteristics of the MOS transistor, it is possible to widely set voltages for desired memory operation by adjusting the thickness of the pillar-shaped p layer 3b, the kind, concentration, and profile of impurities, the impurity concentration and profile of the pillar-shaped p layer 3, the thickness and material of the gate insulating layer 9, and the work functions of the second gate conductor layer 10 and the first gate conductor layer 6. Since a portion below the MOS transistor is not completely depleted and the depleted layer expands in the depth direction of the pillar-shaped p layer 3b, coupling of a gate electrode to the word line of a floating body, which is a disadvantage of a DRAM including no capacitor, hardly has influence. That is, according to the present embodiment, it is possible to design a wide margin of operation voltage as the memory.

(5) The present embodiment is effective in preventing malfunction of the memory cell. In operations of memory cells, operation of the voltage of a target cell causes unnecessary application of voltages to electrodes of some non-target cells within a cell array to cause malfunction, which is a serious problem (for example, Takashi Ohsawa and Takeshi Hamamoto, "Floating Body Cell—a Novel Capacitor-Less DRAM Cell", Pan Stanford Publishing (2011)). Specifically, this refers to a phenomenon in which a cell in which "1" has been written is changed to "0" by an operation of another cell, or a cell in which "0" has been written is changed to "1" by an operation of another cell (hereinafter, the phenomenon due to this malfunction will be represented as a read disturb failure). According to the present embodiment, when "1" is initially written as data information, the accumulated amount of the group of holes 14b can be made larger than the amount of recombination of electrons and holes caused by a transistor operation by adjusting the depth of the pillar-shaped p layer 3a. Even under conditions in which a read disturb failure occurs in existing memories, variations in threshold of the MOSFET are less affected, and the failure is less likely to occur. When "O" is initially written as data information, holes, if generated unintentionally by a transistor operation at reading, immediately diffuse to the pillar-shaped p layer 3a. Thus, by similarly increasing the depth of the pillar-shaped p layer 3a, the change rate of the hole concentration in the pillar-shaped p layer 3a and the pillar-shaped p layer 3b as a whole is small, the threshold value of the MOS transistor is less affected, and a lower probability of occurrence of a read disturb failure than in the existing memories can be achieved. Consequently, the present embodiment provides a structure that is highly resistant to a read disturb failure of the memory.

(6) When looking at the present memory cell in plan view, a single memory cell region serves as a single MOS transistor composed of the second gate insulating layer 9, the second gate conductor layer 10, the pillar-shaped p layer 3b, and the $n^+$ layers 11a, 11b. In other words, a signal accumulation part holding the group of holes 14b which are signal charges and composed of the first gate conductor layer 6, the first gate insulating layer 5, the pillar-shaped p layer 3a, and the $n^+$ layer 11a does not increase the memory cell area. This achieves higher integration of the memory cell.

Figure 4A:
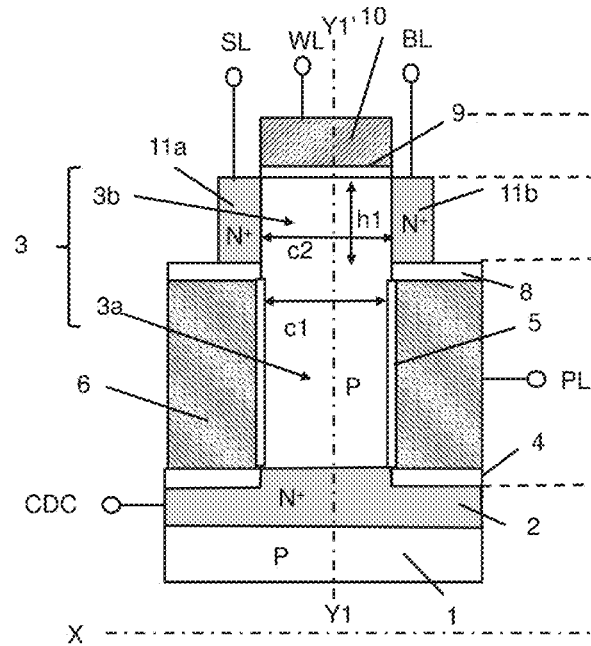
FIGS. 4AA and 4AB are explanatory diagrams of a structure of the memory cell and a MOS transistor of a logic circuit according to the present embodiment formed on the same substrate.
Figure 4A:
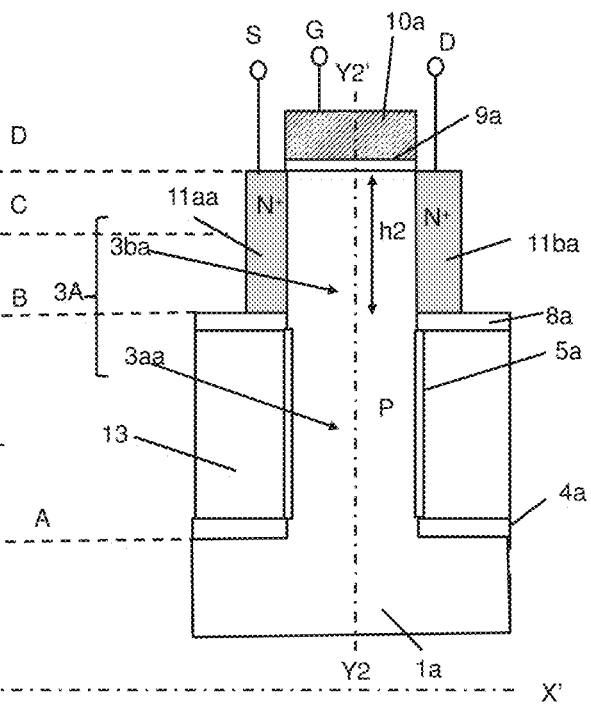
Figure 4B:
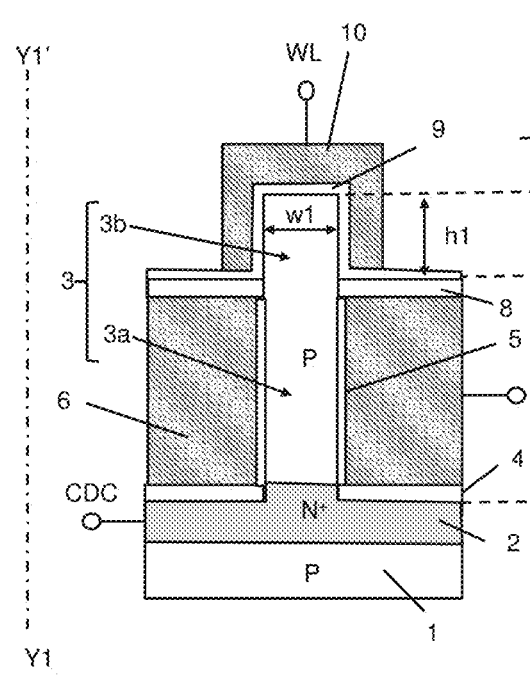
FIGS. 4BA and 4BB are explanatory diagrams of a structure of the memory cell and the MOS transistor of the logic circuit according to the present embodiment formed on the same substrate.
Figure 4B:
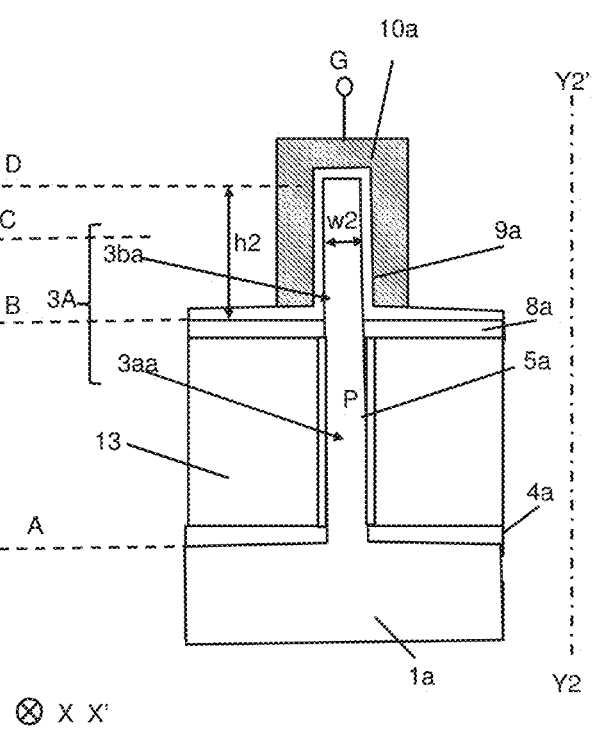
Figure 5A:
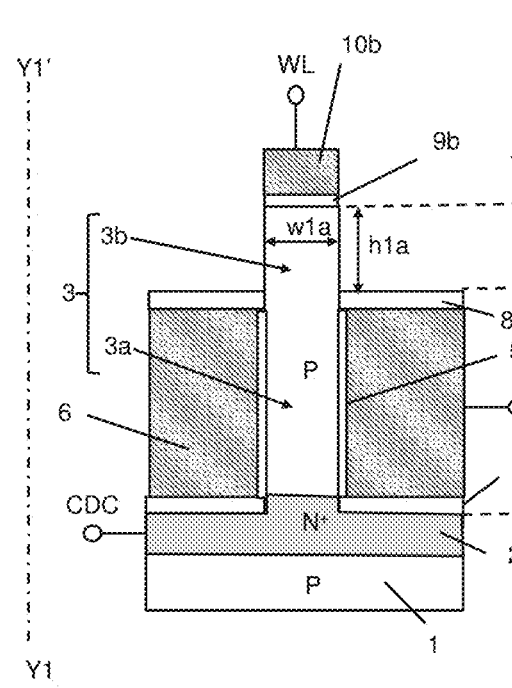
FIGS. 5A and 5B are explanatory diagrams of a structure of the memory cell and the MOS transistor of the logic circuit according to the present embodiment formed on the same substrate.
Figure 5B:
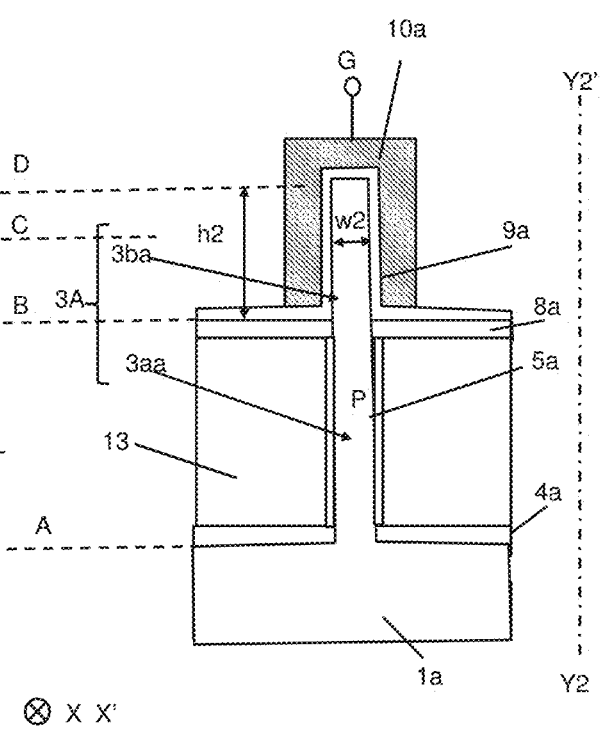

A structure of the memory cell embodiment and the MOS transistor of the logic circuit according to the present formed on the same substrate will be described using FIGS. 4AA, 4AB, FIGS. 4BA, 4BB, FIGS. 4CA, 4CB, and FIGS. 5A, 5B. FIG. 4AA shows a cross-sectional structure of the memory cell. FIG. 4AB shows a cross-sectional structure of the MOS transistor of the logic circuit formed on the same substrate as the memory cell. FIG. 4BA is a cross-sectional view when the cross-section of FIG. 4AA is viewed in the depth direction of the sheet of drawing in the case where the MOS transistor of the memory cell is formed of a Fin MOS transistor. FIG. 4BB is a cross-sectional view when the cross-section of FIG. 4AB is viewed in the depth direction of the sheet of drawing. FIG. 4CA is a cross-sectional view as viewed in the depth direction of the sheet of drawing in the case where the MOS transistor of the memory cell is formed of a planar MOS transistor having a U-shaped channel. FIG. 4CB is a cross-sectional view when the cross-section of FIG. 4AB is viewed in the depth direction of the sheet of drawing. Note that in FIGS. 4AA, 4AB, FIGS. 4BA, 4BB, and FIGS. 4CA, 4CB, constitutional portions identical to those in FIG. 1 are denoted by the same reference characters. FIG. 5A is a cross-sectional view when the cross-section of FIG. 4AA is viewed in the depth direction of the sheet of drawing in the case where the MOS transistor of the memory cell is formed of a planar MOS transistor. FIG. 5B is the same as FIG. 4AB.

The memory cell structure shown in FIG. 4AA is the same as that of FIG. 1. As shown in FIG. 4AB, a pillar-shaped p layer 3A (which is an example of a "second semiconductor pillar" in the claims) which is erected in the vertical direction on a p layer substrate 1a connected to the p layer substrate 1 (which is an example of a "substrate" in the claims), is rectangular in plan view, and has a pillar-shaped vertical cross-section is provided. An insulating layer 4a is placed on the p layer substrate 1a in an outer circumferential part of the pillar-shaped p layer 3A. An insulating layer 5a and an insulating layer 13 (which is an example of an "intermediate material layer" in the claims) are provided to cover the circumference of a pillar-shaped p layer 3aa in a lower part of the pillar-shaped p layer 3A. An insulating layer 8a (which is an example of a "fourth insulating layer" in the claims) is placed on the insulating layers 5a and 13. A third gate insulating layer 9a (which is an example of a "third gate insulating layer" in the claims) is placed to cover an upper surface and side surfaces of a pillar-shaped p layer 3ba in an upper part of the pillar-shaped p layer 3A. A third gate conductor layer 10a (which is an example of a "third gate insulating layer" in the claims) is placed to cover the third gate insulating layer 9a. An $n^+$ layer 11aa (which is an example of a "third impurity layer" in the claims) and an $n^+$ layer 11ba (which is an example of a "fourth impurity layer" in the claims) are placed on opposite ends in the horizontal direction (the direction of the line X-X') of the pillar-shaped p layer 3ba. The third gate conductor layer 10a is connected to a gate line G. The $n^+$ layer 11aa is connected to a source line S. The $n^+$ layer 11ba is connected to a drain line D. Note that the insulating layers 4a, 5a, 8a, and 13 may be formed of separate materials, or the insulating layers 4a and 5a may be formed of an identical material, or the insulating layer 13 may be formed of a conductor layer. Thus, a material layer (which is an example of a "first material layer" in the claims) composed of the insulating layers 4a, 5a, 8a, and 13 can take a form containing or not containing a conductor material.

FIG. 4BA is a cross-sectional view as viewed in the depth direction of the sheet of drawing at the line Y1-Y1' in FIG. 4AA. FIG. 4BB is a cross-sectional view as viewed in the depth direction of the sheet of drawing at the line Y2-Y2' in FIG. 4AB. As shown in FIG. 4BA, the second gate insulating layer 9 covers the upper surface and the opposite side surfaces of the pillar-shaped p layer 3ba. The second gate conductor layer 10 covers the second gate insulating layer 9. As shown in FIG. 4BB, the third gate insulating layer 9a covers the upper surface and the opposite side surfaces of the pillar-shaped p layer 3ba. The third gate conductor layer 10a covers the third gate insulating layer 9a. In this case, the MOS transistor of the memory cell has a channel width w1 equal to or larger than a channel width w2 of the MOS transistor of the logic circuit.

FIGS. 4CA and 4CB show a case where the MOS transistor of the memory cell is formed of a planar MOS transistor having a U-shaped channel. FIG. 4CA is a cross-sectional view of the planar MOS transistor having the U-shaped channel. FIG. 4CB is the same as FIG. 4AB. A pillar-shaped p layer 3bc is placed on and in contact with the pillar-shaped p layer 3a. An insulating layer 15 is placed to surround a side surface of the pillar-shaped p layer 3bc. The pillar-shaped p layer 3bc has a shape recessed downward from the upper surface. A fourth gate insulating layer 9c is placed in contact with the pillar-shaped p layer 3bc. A fourth gate conductor layer 10c is placed to cover the fourth gate insulating layer 9c. $N^+$ layers 11a and 11b are placed in contact with opposite ends of the pillar-shaped p layer 3bc having a U-shape. In this case, a distance h1b between the bottom of the pillar-shaped p layer 3bc and the bottom of the recess is smaller than a length h2 of the pillar-shaped p layer 3ba in FIG. 4CB.

The MOS transistor composed of the $n^+$ layers 11a, 11b, the pillar-shaped p layer 3b, the second gate insulating layer 9, and the second gate conductor layer 10 shown in FIG. 4AA and FIG. 4BA is a Fin N channel MOS transistor. The MOS transistor composed of the $n^+$ layers 11ac, 11bc, the pillar-shaped p layer 3bc, the second gate insulating layer 9c, and the second gate conductor layer 10c shown in FIG. 4CA is a planar N channel MOS transistor having a U-shaped channel. The MOS transistor composed of the $n^+$ layers 11aa, 11ba, the pillar-shaped p layer 3ba, the third gate insulating layer 9a, and the third gate conductor layer 10a shown in FIG. 4AB, FIG. 4BB, and FIG. 4CB is a Fin N channel MOS transistor.

Lengths h1 and h1b in the vertical direction of the pillar-shaped p layers 3b and 3bc in the planar, Fin, and U-shaped channel planar, MOS transistors of the memory cells shown in FIG. 4AA, FIG. 4BA, and FIG. 4CA are shorter than the length h2 in the vertical direction of the pillar-shaped p layer 3ba in the Fin MOS transistor of the logic circuit in FIG. 4AB.

The p layer substrate 1a is connected to the p layer substrate 1 and has an upper surface position substantially aligned with an upper surface position of the $n^+$ layer 2 (the line A in the drawing). The insulating layer 8 has an upper surface position substantially aligned with an upper surface position of the insulating layer 8a (the line B in the drawing). The pillar-shaped p layer 3b has an upper surface position (the line C in the drawing) lower than an upper surface position of the pillar-shaped p layer 3ba (the line D in the drawing). Note that if the length h1 in the vertical direction of the pillar-shaped p layer 3b is shorter than the length h2 of the pillar-shaped p layer 3ba, the upper surface position of the $n^+$ layer 2 and the upper surface position of the p layer 1a may be different according to the manufacturing method. Similarly, the upper surface position of the insulating layer 8 may not be aligned with the upper surface position of the insulating layer 8a.

FIG. 5A is a cross-sectional view when the cross-section of FIG. 4AA is viewed in the depth direction of the sheet of drawing in the case where the MOS transistor of the memory cell is formed of a planar MOS transistor. FIG. 5B is the same as FIG. 4AB.

As shown in FIG. 5A, the gate insulating layer 9b and the gate conductor layer 10b are formed on the upper surface of the p layer 3b.

A length h1a in the vertical direction of the p layer 3b is shorter than the length h2 in the vertical direction of the p layer 3ba. A channel width w1a in the horizontal direction of the p layer 3b is equal to or larger than the channel width w2 in the horizontal direction of the p layer 3ba.

Note that in the memory cell in FIG. 4AA and FIG. 5A and the MOS transistor of the CMOS circuit in FIG. 4AB and FIG. 5B, (1) the lengths h1 and h1a in the vertical direction of the pillar-shaped p layer 3b which is the channel of the MOS transistor of the memory cell are shorter than the length h2 in the vertical direction of the pillar-shaped p layer 3b which is the channel of the MOS transistor of the logic circuit;

(2) the channel width w1 of the pillar-shaped p layer 3b which is the channel of the MOS transistor of the memory cell is equal to or larger than the channel width w2 of the pillar-shaped p layer 3b which is the channel of the MOS transistor of the logic circuit;

(3) the n⁺ layer 2 in the memory cell is not provided in the MOS transistor of the logic circuit; and (4) the first gate conductor layer 6 in the memory cell is the insulating layer 13 in the MOS transistor.

In the region of the logic circuit, a p-channel MOS transistor is formed as a CMOS circuit on the same substrate connected to the p layer substrate 1 together with the n-channel MOS transistor shown in FIG. 4AB. In this case, the length in the vertical direction of the channel of the p-channel MOS transistor is larger than the length h1 in the vertical direction of the pillar-shaped p layer 3b which is the channel of the MOS transistor of the memory cell. The channel width w1 of the pillar-shaped p layer 3b which is the channel of the MOS transistor of the memory cell is equal to or larger than the channel width of the p-channel MOS transistor of the CMOS circuit.

It has been described with reference to FIG. 1 that in the case where the MOS transistor composed of the n⁺ layers 11a, 11b, the pillar-shaped p layer 3b, the second gate insulating layer 9, and the second gate conductor layer 10 is a Fin MOS transistor, the second gate insulating layer 9 is placed at least on the opposite side surfaces of the pillar-shaped p layer 3b between the n⁺ layers 11a and 11b, the second gate conductor layer 10 covers the second gate insulating layer 9, and there are both cases in which the second gate conductor layer 10 is placed on the upper surface and the opposite side surfaces of the pillar-shaped p layer 3b and in which the second gate conductor layer 10 is placed only on the side surfaces of the pillar-shaped p layer 3b. Similarly to the foregoing, in the Fin MOS transistor composed of the n⁺ layers 11aa, 11ba, the pillar-shaped p layer 3ba, the third gate insulating layer 9a, and the third gate conductor layer 10a shown in FIG. 4AB, there are both cases in which the third gate insulating layer 9a is placed on the upper surface and the opposite side surfaces of the pillar-shaped p layer 3ba between the n⁺ layers 11aa and 11ba and in which the third gate insulating layer 9a is placed only on the opposite side surfaces of the pillar-shaped p layer 3ba. A thick insulating layer may be provided on the upper surface of the pillar-shaped p layer 3ba to cause the third gate conductor layer 10a to function as a gate conductor layer, which is formed substantially on the opposite side surfaces of the pillar-shaped p layer 3ba and controls the voltage of the channel.

In the Fin memory cell and the MOS transistor shown in FIGS. 4AA, 4AB and FIGS. 4BA, 4BB, the upper surfaces and the opposite side surfaces of the pillar-shaped p layers 3b and 3ba are respectively covered by the second gate insulating layer 9 and the third gate insulating layer 9a having the same film thickness. In contrast, an insulating layer having a film thickness larger than the film thickness of the second gate insulating layer 9 and the third gate insulating layer 9a may be provided on one or both of the upper surfaces.

In the cross-section shown in FIG. 4BA, a structure provided with two gate conductor layers obtained by dividing the second gate conductor layer 10 to the opposite sides of the pillar-shaped p layer 3b may be adopted. Similarly, in the cross-section shown in FIG. 4BB, a structure provided with two gate conductor layers obtained by dividing the third gate conductor layer 10a to the opposite sides of the pillar-shaped p layer 3ba may be adopted.

The memory cell and the MOS transistor of the logic circuit of the present embodiment have the following characteristics.

(1) In the Fin MOS transistor of the logic circuit, the channel width w2 decreases and the length h2 of the channel increases with higher circuit integration. Decreasing the channel width w2 is to reduce the area of the MOS transistor in plan view. Increasing the length h2 of the channel is to compensate for a decrease in on-state current caused by the decrease in the channel width w2. In contrast, in the MOS transistor of the memory cell, when the length h1 of the channel is increased, the back-bias effect exerted by the group of holes 14b accumulated in the pillar-shaped p layer 3a described with reference to FIGS. 2A, 2B, and 2C is reduced, resulting in degradation in memory properties or a failure in performing a normal memory operation. This problem becomes pronounced with higher circuit integration. In contrast, the present embodiment can prevent the back-bias effect from degrading by making the length h1 of the channel of the MOS transistor of the memory cell lower than the length h2 of the channel of the MOS transistor of the logic circuit.

(2) As shown in FIGS. 4AA, 4AB, FIGS. 4BA, 4BB, and FIGS. 4CA, 4CB, substantially aligning the upper surface position of the n⁺ layer 2 in the memory cell and the upper surface position of the p layer substrate 1a of the MOS transistor of the logic circuit and substantially aligning the bottom surface positions of the pillar-shaped p layer 3a which is the channel of the MOS transistor of the memory cell and the pillar-shaped p layer 3ba which is the channel of the MOS transistor of the logic circuit achieves simplified manufacturing of the memory cell and the MOS transistor of the logic circuit to be formed on the same substrates 1, 1a.

Figure 6A:
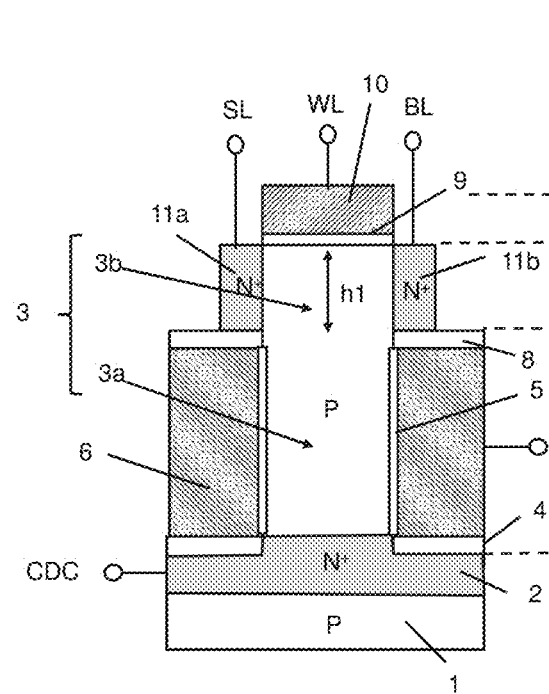
FIGS. 6A and 6B are explanatory diagrams of a structure of the memory cell and the MOS transistor of the logic circuit according to the present embodiment formed on the same substrate.
Figure 6B:
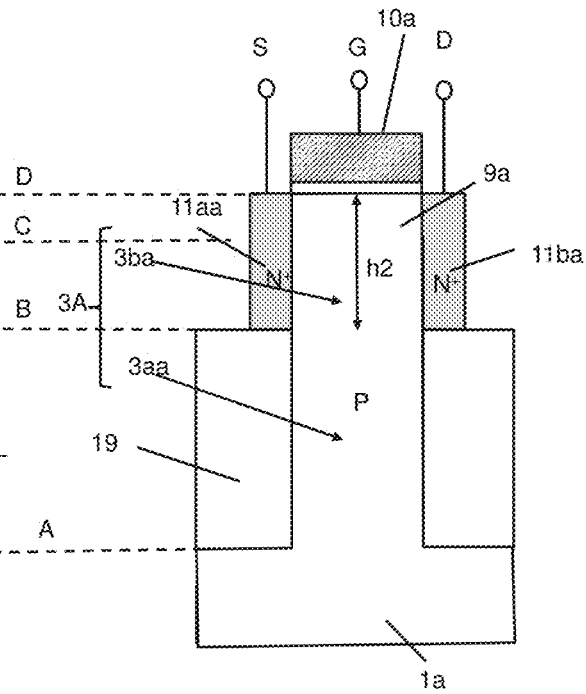

A structure of the memory cell and the MOS transistor of the logic circuit according to the present embodiment formed on the same substrate will be described using FIGS. 6A and 6B. FIG. 6A shows a cross-sectional structure of the memory cell. FIG. 6B shows a cross-sectional structure of the MOS transistor of the logic circuit formed on the same substrate as the memory cell. Note that in FIGS. 6A and 6B, constitutional portions identical to those in FIGS. 4AA, 4AB, FIGS. 4BA, 4BB, and FIGS. 4CA, 4CB are denoted by the same reference characters.

The cross-sectional structure of the memory cell shown in FIG. 6A is the same as that shown in FIG. 4AA. In the MOS transistor of the logic circuit shown in FIG. 6B, the insulating layers 4a, 5a, 8a, and 13 in FIG. 4AB are formed by a single insulating layer 19. The memory cell requires the insulating layers 4 and 8 on and under the first gate conductor layer 6 which is a conductor layer. In contrast, in the MOS transistor of the logic circuit, a portion corresponding to the first gate conductor layer 6 is an insulating layer. Thus, the single insulating layer 19 surrounding the pillar-shaped p layer 3aa may be formed.

Note that in forming the insulating layer 19, at least two or more of the insulating layers 4a, 5a, 8a, and 13 in FIG. 4AB may be formed simultaneously. For example, the insulating layers 4a, 13, and 8a may be formed simultaneously leaving the insulating layer 5a. The insulating layers 4a and 5a may be formed simultaneously. In this case, the insulating layers 4, 4a, 5, and 5a are formed simultaneously. The insulating layers 13 and 8a may be formed simultaneously.

A structure of the memory cell and the MOS transistor of the logic circuit according to the present embodiment formed on the same substrate will be described using FIGS. 7A and 7B. FIG. 7A shows a cross-sectional structure of the memory cell. FIG. 7B shows a cross-sectional structure of the MOS transistor of the logic circuit formed on the same substrate as the memory cell. Note that in FIGS. 7A and 7B, constitutional portions identical to those in FIGS. 4AA, 4AB, FIGS. 4BA, 4BB, FIGS. 5A, 5B, and FIGS. 6A, 6B are denoted by the same reference characters.

The cross-sectional structure of the memory cell shown in FIG. 7A is the same as that shown in FIG. 4AA. In FIG. 7B, a back-gate conductor layer 6a connects to a back-gate line BGL, and the n layer 2a connects to a control line CDCa. The voltage to be applied to the back-gate line BGL is controlled to control the voltage of the pillar-shaped p layer 3aa. The threshold voltage of the MOS transistor composed of the pillar-shaped p layer 3ba, the third gate insulating layer 9a, the third gate conductor layer 10a, and the n⁺ layers 11aa, 11ba placed on the pillar-shaped p layer 3aa is thereby changed. Accordingly, the threshold voltage of each of a plurality of MOS transistors included in the logic circuit can be set as desired by changing the voltage to be applied to the back-gate line BGL. Note that in FIG. 7B, the n layer 2a may not be provided. In this case, the MOS transistor needs to be driven under a condition in which the voltage to be applied to the control line CDCa is such that the whole pillar-shaped p layer 3aa is depleted. Therefore, the concentration of acceptor impurities in the pillar-shaped p layer 3aa may be made smaller than the concentration of acceptor impurities in the pillar-shaped p layer 3ba. The n layer 2a may be surrounded by a p well, and the voltage of the n layer 2a may be controlled by applying the voltage to the p well.

In an actual logic circuit, a MOS transistor having a plurality of threshold voltages is formed. The threshold voltages are changed by a method such as using a metal layer having a different work function for the third gate conductor layer 10a, for example, or changing the impurity concentration of the pillar-shaped p layer 3ba. In contrast, in the present embodiment, the threshold voltages can be set merely by changing the voltage to be applied to the back-gate line BGL. Furthermore, by changing the back-gate conductor layer 6a based on an operating period, circuit consumption power is reduced, for example.

Steps of forming the memory cell and the MOS transistor of the logic circuit on the same substrate will be described using FIGS. 8AA to 8KB.

Figure 8A:
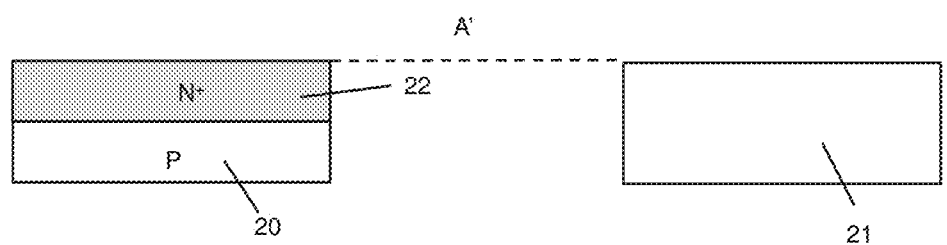
FIGS. 8AA and 8AB are explanatory diagrams of a manufacturing method for forming the memory cell and the MOS transistor of the logic circuit according to the present embodiment on the same substrate.

As shown in FIGS. 8AA and 8AB, an n⁺ layer 22 is formed as a layer overlaying the p layer substrate 20 in a memory cell region in FIG. 8AA. In a logic circuit region shown in FIG. 8AB, a p layer substrate 21 is connected to the p layer substrate 20 shown in FIG. 8AA and has a surface position aligned with the upper surface position of the n⁺ layer 22 at the line A'. The n⁺ layer 22 is formed by ion implantation into the p layer substrate 20, plasma impurity doping, the epitaxial crystal growth method, or the like. In the epitaxial crystal growth method, the p layer 20 is etched to a predetermined depth, followed by steps such as epitaxial crystal growth of a semiconductor layer containing donor impurities and CMP (Chemical Mechanical Polishing) on the surface in order to make the memory region and the logic region have the same surface position.

Next, as shown in FIGS. 8BA and 8BB, p layers 23a and 23b are formed simultaneously on the n⁺ layer 22 and the p layer 21, respectively, by the epitaxial crystal growth method, for example. Then, a mask material layer 24 made of a silicon nitride film, for example, is formed on the p layer 23b.

Figure 8C:
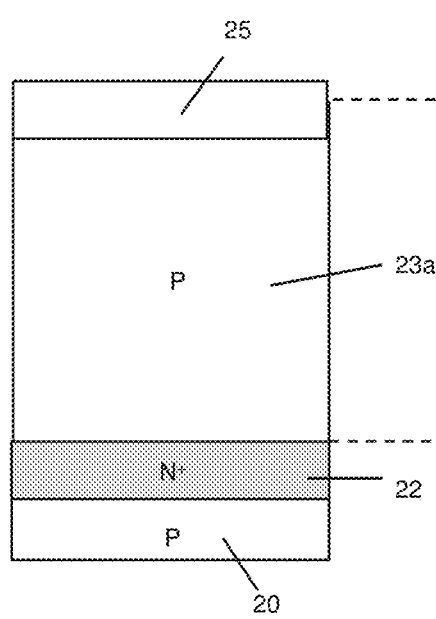
FIGS. 8CA and 8CB are explanatory diagrams of the manufacturing method for forming the memory cell and the MOS transistor of the logic circuit according to the present embodiment on the same substrate.
Figure 8C:
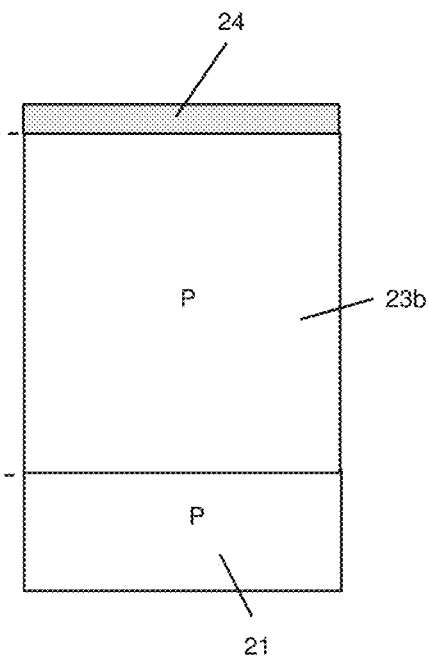

Next, as shown in FIGS. 8CA and 8CB, an upper surface of the p layer 23a in the memory cell region is subjected to the wet oxidation method to form a SiO₂ layer 25. In this case, an upper surface of the p layer 23b is not oxidized because of being covered by the mask material layer 24 made of the silicon nitride film. Accordingly, the upper surface position of the p layer 23a becomes lower than the upper surface position (the line D) of the p layer 23b. Then, the SiO₂ layer 25 and the mask material layer 24 are removed.

Figure 8D:
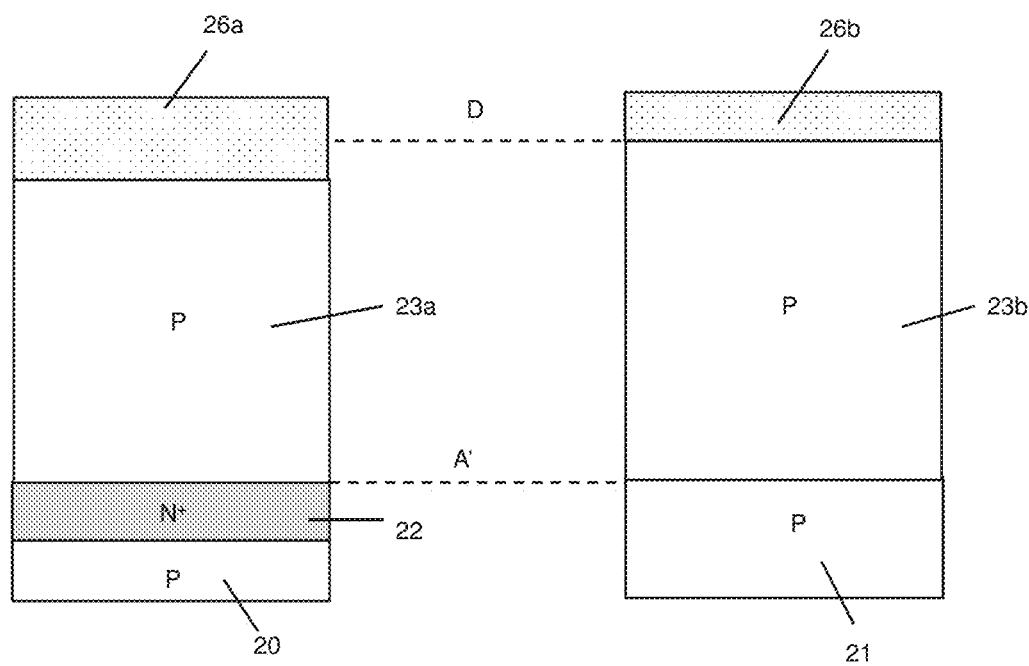
FIGS. 8DA and 8DB are explanatory diagrams of the manufacturing method for forming the memory cell and the MOS transistor of the logic circuit according to the present embodiment on the same substrate.

Next, as shown in FIGS. 8DA and 8DB, mask material layers 26a and 26b having the same upper surface position are formed on the p layers 23a and 23b, respectively, using the CVD (Chemical Vapor Deposition) method and the CMP (Chemical Mechanical Polishing) method, for example.

Next, as shown in FIGS. 8EA and 8EB, the p layers 23a and 23b are etched by the RIE (Reactive Ion Etching) method, for example, using the mask material layers 26a and 26b as masks, such that the bottom of etching is positioned at the line A, thereby forming pillar-shaped p layers 30a and 30b, respectively. In the memory cell region, etching is performed such that the bottom of etching is positioned at the line A in an upper part of the n⁺ layer 22a. In this case, etching depths in the memory region and the logic circuit region are substantially the same. Thus, the bottom position in the vertical direction of the pillar-shaped p layer 30ba is located above the line A. The upper surface position of the pillar-shaped p layer 30ba is higher than a line C at the upper surface position of the pillar-shaped p layer 30a.

Next, as shown in FIGS. 8FA and 8FB, the memory region is covered by a SiO₂ layer 32. Then, etching is performed further using a mask material layer 26ba as an etching mask, thereby substantially aligning the upper surface position of the p layer 21 in the outer circumferential part of the pillar-shaped p layer 30ba with the line A.

Next, as shown in FIGS. 8GA and 8GB, surface layers of the pillar-shaped p layer 30a and the n⁺ layer 22a are oxidized to form an oxidized insulating layer 33a, and surface layers of the pillar-shaped p layer 30ba and the p layer substrate 21 are oxidized simultaneously to form an oxidized insulating layer 33b. The oxidized insulating layers 33a and 33b may be formed by another method such as ALD (Atomic Layer Deposition), for example. The outer circumferential parts of the pillar-shaped p layers 30a and 30ba and their side surfaces may be formed separately.

Next, as shown in FIGS. 8HA and 8HB, poly-Si layers 35a and 35b containing many donor or acceptor impurities, for example, are formed respectively to surround lower sides of the oxidized insulating layers 33a and 33b in the portions covering the pillar-shaped p layers 30a and 30ba. Then, insulating layers 36a and 36b are formed respectively on the poly-Si layers 35a and 35b. Accordingly, the insulating layers 36a and 36b have substantially the same surface positions at the height of the line B. The insulating layers 36a and 36b may be formed by another method such as oxidizing the poly-Si layers 35a and 35b.

Next, as shown in FIGS. 8IA and 8IB, the poly-Si layer 35b in the logic circuit region is removed. Then, an insulating layer 37 of SiO₂, for example, is formed in a space created by the removal by the CVD (Chemical Vapor Deposition) method, for example. Then, the insulating layers 33a and 33b above the insulating layers 36a and 36b in the vertical direction are removed to form insulating layers 33aa and 33ba, respectively. Note that the insulating layer 37 may be formed of another insulating material layer other than $SiO_2$. Alternatively, the poly-Si layer 35b and the insulating layer 36b in the logic circuit region may be removed to form an insulating layer having an upper surface located at the height of the line B in the vertical direction. Then, the mask material layer 26aa and 26ba are removed.

Next, as shown in FIGS. 8JA and 8JB, a second gate insulating layer 38a that covers the upper surface or the upper surface and the opposite side surfaces of the pillar-shaped p layer 30a as well as a third gate insulating layer 38b that covers the upper surface and the opposite side surfaces of the pillar-shaped p layer 30ba are formed. Then, a second gate conductor layer 39a that covers the second gate insulating layer 38a and a third gate conductor layer 39b that covers the third gate insulating layer 38b are formed. Note that the second gate conductor layer 39a and the third gate conductor layer 39b may be formed by a method such as the Gate-first process or Gate-last process, for example (see, for example, Martin M. Frank, "High-k/Metal Gate Innovations Enabling Continued CMOS Scaling" Proc. of the 41th European Solid-state Device Research Conference pp. 50-58 (2011)). Next, $N^+$ layers 40a and 40b are formed on opposite ends of the pillar-shaped p layer 30a above the insulating layer 30a. Then, $N^+$ layers 40ab and 40bb are formed on opposite ends of the pillar-shaped p layer 30ba above the insulating layer 36b. Note that LDD (Lightly-Doped Drain) regions may be formed respectively between the pillar-shaped p layer 30a and $N^+$ layers 40a, 40b and between the pillar-shaped p layer 30ba and the $n^+$ layers 40ab, 40bb.

Next, as shown in FIGS. 8KA and 8KB, the whole surface is covered by an insulating layer 42. Then, a wire layer 43a connected to the $n^+$ layer 40a, a wire layer 43b connected to the gate conductor layer 39a, a wire layer 43c connected to the $n^+$ layer 40b, a wire layer 44a connected to the $n^+$ layer 40ab, a wire layer 44b connected to the gate conductor layer 39b, and a wire layer 44c connected to the $n^+$ layer 40bb are formed. The wire layer 43a is connected to the source line SL. The wire layer 43b is connected to the word line WL. The wire layer 43c is connected to the bit line BL. The wire layer 40ab is connected to the source line S. The wire layer 44b is connected to the gate line G. The wire layer 44c is connected to the drain line D. The poly-Si layer 35a is connected to the plate line PL. The $n^+$ layer 22 is connected to the control line CDC. The memory cell and the n-channel MOS transistor are thereby formed on the p layer substrates 20 and 21 connected to each other.

Note that the method for manufacturing the n-channel MOS transistor in the logic circuit region has been described with reference to FIGS. 8AA to 8KB. In an actual logic circuit region, a p-channel MOS transistor is also formed on the p layer substrate 21. In this p-channel MOS transistor, the $n^+$ layers 40ab and 40bb in the n-channel MOS transistor will be $p^+$ layers containing many acceptor impurities.

In the explanation of the above-described manufacturing method, the $n^+$ layer 22a in the outer circumferential part of the pillar-shaped p layer 30a and the p layer 21 in the outer circumferential part of the pillar-shaped p layer 30ba are formed to have substantially the same upper surface position at the line A. In contrast, the steps shown in FIGS. 8FA and 8FB may be omitted, so that the $n^+$ layer 22a in the outer circumferential part of the pillar-shaped p layer 30a and the p layer 21 in the outer circumferential part of the pillar-shaped p layer 30ba may have different upper surface positions.

The pillar-shaped p layers 30a and 30b may be formed by depositing, in layers, a material layer to be the poly-Si layer 35a and overlying and underlying insulating layers, then cutting holes extending through these layers, and performing the selective epitaxial crystal growth method, MILC (Metal Induced Lateral Crystallization) method (see, for example, H. Miyagawa et al. "Metal-Assisted Solid-Phase Crystallization Process for Vertical Monocrystalline Si Channel in 3D Flash Memory", IEDM19 digest paper, pp. 650-653 (2019)), or the like. The poly-Si layer 35a may be formed by etching a dummy gate material initially formed and then burying the poly-Si layer 35a in a created space.

Note that the p layer substrate 1 in FIG. 1 may be a semiconductor or insulating layer, or may be a well layer. The same applies to other embodiments.

Although the example in which $p^+$ poly is used for the first gate conductor layer 6 and $n^+$ poly is used for the second gate conductor layer 10 has been described with reference to FIG. 1, a combination such as a laminate of $p^+$ poly (5.15 eV)/W and TiN (4.7 eV), a laminate of $p^+$ poly (5.15 eV)/silicide and $n^+$ poly (4.05 eV), or a laminate of TaN (5.43 eV)/W and TiN (4.7 eV), for example, may be adopted if the work function of the first gate conductor layer 6 is larger than the work function of the second gate conductor layer 10. In a case where n-type semiconductor is used for the pillar-shaped p layer 3, similar effects can be obtained by using $n^+$ poly for the first gate conductor layer 6 and $p^+$ poly for the gate conductor layer 10, for example, if the work function of the first gate conductor layer 6 is smaller than the work function of the second gate conductor layer 10. Note that the first gate conductor layer 6 and the second gate conductor layer 10 may be semiconductor, metal, or a compound thereof. The same applies to other embodiments.

Although the example in which the vertical cross-sectional shape of the pillar-shaped p layers 30a and 30ba in FIGS. 8KA and 8KB is rectangular has been described, the vertical cross-sectional shape may be trapezoidal, barreled, or varied in shape on the upper and lower sides of the line B in the vertical direction. One of the pillar-shaped p layer 30a and the pillar-shaped p layer 30ba may be trapezoidal, and the other may be rectangular. The same applies to other embodiments. The horizontal cross-sections of the pillar-shaped p layers 30a and 30ba may be square, rectangular, or oval. The same applies to other embodiments.

The $n^+$ layer 2 is depicted in FIG. 1 as being connected to an adjacent memory cell, but may be continuous between memory cells in the whole memory block region. The $n^+$ layer 2 may be formed to be connected to an $n^+$ layer of an adjacent cell located in a direction in which the word line WL extends and may be formed to be isolated from an $n^+$ layer of an adjacent cell located in a direction orthogonal to the direction in which the word line WL extends. Alternatively, the $n^+$ layer 2 may be placed only at the bottom of the pillar-shaped p layer 3. In this case, the voltage of the n' layer 2 may be controlled by the voltage to be applied to the p layer substrate. The same applies to other embodiments.

In the case where the $n^+$ layer 2 shown in FIG. 1 is connected to an adjacent memory cell and connected to the control line CDC, a conductor layer may be provided on part of or all over the $n^+$ layer 2 in the outer circumferential part of the pillar-shaped p layer 3 in plan view. The $n^+$ layer 2 may not be connected to the control line CDC. In this case, 0 V, for example, may be applied to the p layer substrate 1 to control the voltage of the $n^+$ layer 2. The same applies to other embodiments.

The $n^+$ layer 40a connected to the source line SL in the memory cell shown in FIG. 8KA may be shared by cells adjacent to each other. The n⁺ layer 40b connected to the bit line BL may be shared by cells adjacent to each other. This enables higher integration of memory regions. The same applies to other embodiments.

In FIG. 1, the first gate conductor layer 6 may be divided into a plurality of layers in the horizontal cross-section or the vertical direction to be driven synchronously or asynchronously. Similarly, the second gate conductor layer 10 may be divided into a plurality of layers in the horizontal cross-section or the vertical direction to be driven synchronously or asynchronously. This also achieves a normal memory operation. The same applies to other embodiments.

Note that a substrate such as a SOI (Silicon On Insulator) substrate or a well structure may be used as the p layer substrate 1 in FIG. 1. A MOS transistor circuit isolated by an insulating layer may be provided under the n⁺ layer 2. The same applies to other embodiments.

In the manufacturing method in FIGS. 8AA to 8KB, the pillar-shaped p layers 30a and 30b are formed by etching the p layers 23a and 23b using the mask material layer 26aa and 26ba as etching masks. In contrast, a poly-Si layer which is continuous in the horizontal direction, for example, may be formed on the whole surface, holes may be cut in this poly-Si layer, and the pillar-shaped p layers 30a and 30b may be formed by the epitaxial crystal growth method, for example. The same applies to other embodiments.

In FIGS. 4AA and 4AB, the upper surface position of the n⁺ layer 2 around the bottom of the pillar-shaped p layer 3 and the upper surface position of the p layer substrate 1a around the bottom of the pillar-shaped p layer 3A in the vertical direction are substantially aligned with each other at the line A, but may not be aligned with each other. For example, in a case where the n-channel MOS transistor in FIG. 4AB is formed on a p well sectioned by STI (Shallow Trench Isolation), the length between the lines A and B of the n-channel MOS transistor may be shorter than the length between the lines A and B of the memory cell in FIG. 4AA. The same applies to a p-channel MOS transistor. The same applies to other embodiments.

Various embodiments and modifications can be made to the present invention without departing from the broad spirit and scope of the present invention. Each embodiment described above is for explaining an embodiment of the present invention, and does not limit the scope of the present invention. The embodiments and modifications described above can be combined as desired. Further, even if some of the components in the above-described embodiments are removed as necessary, the resulting structure falls within the technical idea of the present invention.

INDUSTRIAL APPLICABILITY

The use of the semiconductor device including the memory element according to the present invention can provide a high-performance and low-cost semiconductor device.

What is claimed is:

1. A semiconductor device comprising:
a memory element including
a first semiconductor pillar erected on a substrate in a vertical direction with respect to the substrate,
a first impurity region connected to a bottom of the first semiconductor pillar,
a first gate insulating layer placed in contact with a side surface of the first semiconductor pillar,
a first gate conductor layer placed in contact with the first gate insulating layer,
a second semiconductor pillar placed on and in contact with the first semiconductor pillar,
a first insulating layer placed on the first gate conductor layer and surrounding a vicinity of a boundary between the first semiconductor pillar and the second semiconductor pillar,
a second impurity region and a third impurity region placed in contact with the second semiconductor pillar and on the first insulating layer and opposed to each other in a horizontal direction,
a second gate insulating layer placed in contact with at least one of an upper surface and opposite side surfaces of the second semiconductor pillar between the second impurity region and the third impurity region in the horizontal direction, and
a second gate conductor layer placed in contact with the second gate insulating layer; and
a MOS transistor including
a third semiconductor pillar erected on the substrate in the vertical direction with respect to the substrate,
a first material layer surrounding the third semiconductor pillar and containing an insulating material or a conductor material insulated from the third semiconductor pillar,
a fourth semiconductor pillar placed on and in contact with the third semiconductor pillar,
a third gate insulating layer placed in contact at least with opposite side surfaces of the fourth semiconductor pillar,
a third gate conductor layer placed in contact with the third gate insulating layer, and
a fourth impurity region and a fifth impurity region placed in contact with a portion of the fourth semiconductor pillar and opposed to each other in the horizontal direction, the portion being not covered by the third gate insulating layer, wherein
in the vertical direction, the second semiconductor pillar has a length shorter than a length of the fourth semiconductor pillar.

2. The semiconductor device according to claim 1, wherein in the vertical direction, the first semiconductor pillar and the third semiconductor pillar have upper surfaces at a substantially same position.

3. The semiconductor device according to claim 1, wherein in the vertical direction, the first semiconductor pillar and the third semiconductor pillar have bottoms at a substantially same position.

4. The semiconductor device according to claim 1, wherein
the first material layer includes
a second insulating layer surrounding the third semiconductor pillar, and
a first conductor layer surrounding the second insulating layer, and
a temporally-constant or varying voltage is applied to the first conductor layer.

5. The semiconductor device according to claim 4, wherein the MOS transistor includes a sixth impurity region connected to a bottom of the third semiconductor pillar.

6. The semiconductor device according to claim 1, wherein the MOS transistor is a Fin MOS transistor composed of the fourth semiconductor pillar, the third gate insulating layer, the third gate conductor layer, the fourth impurity region, and the fifth impurity region.

7. The semiconductor device according to claim 1, wherein in the memory element, a transistor composed of the second semiconductor pillar, the second gate insulating layer, the second gate conductor layer, the second impurity region, and the third impurity region is a planar MOS transistor.

8. The semiconductor device according to claim 1, wherein in the memory element, a transistor composed of the second semiconductor pillar, the second gate insulating layer, the second gate conductor layer, the second impurity region, and the third impurity region is a Fin MOS transistor.

9. The semiconductor device according to claim 1, wherein
   in the memory element, a transistor composed of the second semiconductor pillar, the second gate insulating layer, the second gate conductor layer, the second impurity region, and the third impurity region is a planar MOS transistor having a U-shaped channel,
   the second semiconductor pillar has a vertical cross-section having a U-shape, and
   a length in the vertical direction of the second semiconductor pillar at a bottom of the U-shape is shorter than the length of the fourth semiconductor pillar.

10. The semiconductor device according to claim 1, wherein the first impurity region is connected to a bottom of a semiconductor pillar of another memory cell adjacent to the first semiconductor pillar.

11. The semiconductor device according to claim 1, wherein the first impurity region is isolated from an impurity layer at a bottom of a semiconductor pillar of another memory cell adjacent to the first semiconductor pillar.

12. The semiconductor device according to claim 1, wherein the first gate conductor layer is divided into two or more layers in the vertical direction.

13. The semiconductor device according to claim 1, wherein the first gate conductor layer is divided into two or more layers in a horizontal cross-section.

14. The semiconductor device according to claim 1, wherein the semiconductor device performs
   a memory write operation of controlling voltages to be applied to the second impurity region, the third impurity region, and the second gate conductor layer to generate, in the second semiconductor pillar, a group of electrons and a group of holes by an impact ionization phenomenon based on a current caused to flow between the second impurity region and the third impurity region or by a gate-induced drain leakage current, and causing part or whole of the group of electrons or the group of holes which are majority carriers in the group of electrons and the group of holes as generated to remain mainly in the first semiconductor pillar, and
   a memory erase operation of extracting the group of electrons or the group of holes which remain and are majority carriers from any or all of the first impurity region, the second impurity region, and the third impurity layer.

15. The semiconductor device according to claim 1, wherein the semiconductor device performs
   a memory write operation of controlling voltages to be applied to one or both of the second impurity region and the third impurity region, the first impurity region, and the first gate conductor layer to generate, in the first semiconductor pillar, a group of electrons and a group of holes by an impact ionization phenomenon based on a current caused to flow between one or both of the second impurity region and the third impurity region, and the first impurity region or by a gate-induced drain leakage current, and causing part or whole of the group of electrons or the group of holes which are majority carriers in the group of electrons and the group of holes as generated to remain mainly in the first semiconductor pillar, and
   a memory erase operation of extracting the group of electrons or the group of holes which remain and are majority carriers from any or all of the first impurity region, the second impurity region, and the third impurity layer.

* * * * *